United States Patent
Jung et al.

(10) Patent No.: US 10,091,325 B2
(45) Date of Patent: *Oct. 2, 2018

(54) METHODS AND SYSTEMS FOR DATA SERVICES

(71) Applicant: Elwha LLC, Bellevue, WA (US)

(72) Inventors: Edward K. Y. Jung, Bellevue, WA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 1629 days.

This patent is subject to a terminal disclaimer.

(21) Appl. No.: 13/987,300

(22) Filed: Oct. 30, 2012

(65) Prior Publication Data

US 2014/0136422 A1    May 15, 2014

(51) Int. Cl.
| | |
|---|---|
| G06F 15/16 | (2006.01) |
| H04L 29/08 | (2006.01) |
| H04L 29/06 | (2006.01) |
| G06Q 10/10 | (2012.01) |
| G06F 12/00 | (2006.01) |

(52) U.S. Cl.
CPC ......... *H04L 67/306* (2013.01); *G06Q 10/101* (2013.01); *H04L 63/0428* (2013.01); *H04L 63/10* (2013.01); *H04L 67/34* (2013.01)

(58) Field of Classification Search
CPC .. G06F 21/60; G06F 21/6218; G06F 21/6254; G06F 2221/2111; G06F 2221/2117; G06F 2221/2141; G06F 2221/2149; G06F 2221/2153; G06F 2221/2107; H04L 29/0602; H04L 29/06551; H04L 29/08072; H04L 41/5054; H04L 63/10; H04L 67/14

See application file for complete search history.

(56) References Cited

U.S. PATENT DOCUMENTS

| | | | |
|---|---|---|---|
| 6,029,175 | A | 2/2000 | Chow et al. |
| 6,122,520 | A | 9/2000 | Want et al. |
| 6,509,830 | B1 | 1/2003 | Elliott |
| 6,871,277 | B1 | 3/2005 | Keronen |
| 7,178,034 | B2 | 2/2007 | Cihula et al. |
| 7,203,752 | B2 | 4/2007 | Rice et al. |
| 7,269,853 | B1 | 9/2007 | Dunn |
| 7,496,652 | B2 | 2/2009 | Pezzutti |

(Continued)

FOREIGN PATENT DOCUMENTS

| | | | | |
|---|---|---|---|---|
| EP | 1818807 A | | 8/2007 | |
| WO | WO 01/28273 | * | 4/2001 | ............. H04W 4/02 |
| WO | WO 01/28273 A1 | | 4/2001 | |

OTHER PUBLICATIONS

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

(Continued)

*Primary Examiner* — Zarni Maung

(57) ABSTRACT

A method substantially as shown and described the detailed description and/or drawings and/or elsewhere herein. A device substantially as shown and described the detailed description and/or drawings and/or elsewhere herein.

20 Claims, 36 Drawing Sheets

(56) References Cited

U.S. PATENT DOCUMENTS

| | | | |
|---|---|---|---|
| 7,647,164 B2 | 1/2010 | Reeves | |
| 7,680,889 B2 | 3/2010 | Blumenau et al. | |
| 7,685,238 B2 | 3/2010 | Etelapera | |
| 7,849,311 B2 | 12/2010 | Donlin et al. | |
| 7,860,807 B2 | 12/2010 | Kaneko et al. | |
| 7,873,957 B2 | 1/2011 | Nallipogu et al. | |
| 7,913,312 B2 | 3/2011 | de Jong | |
| 7,917,154 B2 | 3/2011 | Fortescue et al. | |
| 7,996,682 B2 | 8/2011 | Schutz et al. | |
| 8,175,794 B1 | 5/2012 | Szybalski | |
| 8,364,389 B2 | 1/2013 | Dorogusker et al. | |
| 8,387,155 B2 | 2/2013 | Gregg et al. | |
| 8,504,729 B2 | 8/2013 | Pezzutti | |
| 8,554,608 B1 | 10/2013 | O'Connor | |
| 8,578,483 B2 | 11/2013 | Seshadri et al. | |
| 8,630,494 B1 | 1/2014 | Svendsen | |
| 8,756,321 B2 | 6/2014 | Clark et al. | |
| 8,838,751 B1 | 9/2014 | Scofield et al. | |
| 9,047,648 B1 | 6/2015 | Lekutai et al. | |
| 9,088,450 B2 * | 7/2015 | Jung | H04L 41/5054 |
| 9,749,206 B2 * | 8/2017 | Jung | H04L 43/0876 |
| 2001/0025316 A1 | 9/2001 | Oh | |
| 2002/0032798 A1 | 3/2002 | Xu | |
| 2003/0023726 A1 | 1/2003 | Rice et al. | |
| 2003/0045308 A1 | 3/2003 | Sidhu et al. | |
| 2003/0130893 A1 | 7/2003 | Farmer | |
| 2003/0145229 A1 | 7/2003 | Cohen et al. | |
| 2003/0191877 A1 | 10/2003 | Zaudtke et al. | |
| 2004/0002902 A1 | 1/2004 | Muehlhaeuser | |
| 2004/0036611 A1 | 2/2004 | Kidney et al. | |
| 2004/0128500 A1 | 7/2004 | Cihula et al. | |
| 2004/0214576 A1 | 10/2004 | Myers et al. | |
| 2004/0230835 A1 | 11/2004 | Goldfeder et al. | |
| 2005/0162699 A1 | 7/2005 | Fukunaga et al. | |
| 2005/0182825 A1 | 8/2005 | Eytchison | |
| 2005/0272445 A1 | 12/2005 | Zellner | |
| 2005/0278342 A1 | 12/2005 | Abdo et al. | |
| 2006/0010047 A1 | 1/2006 | Minor | |
| 2006/0031337 A1 | 2/2006 | Kim | |
| 2006/0229778 A1 | 10/2006 | Obradovich et al. | |
| 2007/0006321 A1 | 1/2007 | Bantz et al. | |
| 2007/0044143 A1 | 2/2007 | Zhu et al. | |
| 2007/0113079 A1 | 5/2007 | Ito et al. | |
| 2007/0136466 A1 | 6/2007 | Etelapera | |
| 2007/0142727 A1 | 6/2007 | Zhang et al. | |
| 2007/0232268 A1 | 10/2007 | Park et al. | |
| 2007/0273583 A1 | 11/2007 | Rosenberg | |
| 2008/0046886 A1 | 2/2008 | Brown et al. | |
| 2008/0076451 A1 | 3/2008 | Sheha et al. | |
| 2008/0102856 A1 | 5/2008 | Fortescue et al. | |
| 2008/0126541 A1 | 5/2008 | Rosenberg et al. | |
| 2008/0153670 A1 | 6/2008 | McKirdy et al. | |
| 2008/0189793 A1 | 8/2008 | Kirkup et al. | |
| 2008/0207232 A1 | 8/2008 | Rice et al. | |
| 2008/0229389 A1 | 9/2008 | Singh et al. | |
| 2009/0077085 A1 | 3/2009 | Olivieri et al. | |
| 2009/0160970 A1 | 6/2009 | Fredlund et al. | |
| 2009/0248833 A1 | 10/2009 | Frazier | |
| 2010/0015993 A1 | 1/2010 | Dingler et al. | |
| 2010/0024020 A1 | 1/2010 | Baugher et al. | |
| 2010/0035596 A1 | 2/2010 | Nachman et al. | |
| 2010/0070475 A1 | 3/2010 | Chen | |
| 2010/0082237 A1 | 4/2010 | Black | |
| 2010/0094458 A1 | 4/2010 | Sagady et al. | |
| 2010/0107225 A1 | 4/2010 | Spencer et al. | |
| 2010/0151842 A1 | 6/2010 | De Vries | |
| 2010/0238985 A1 | 9/2010 | Traywick et al. | |
| 2010/0324819 A1 | 12/2010 | Nurminen et al. | |
| 2010/0325239 A1 | 12/2010 | Khedouri et al. | |
| 2011/0018759 A1 | 1/2011 | Bennett et al. | |
| 2011/0022468 A1 | 1/2011 | Muster et al. | |
| 2011/0059693 A1 | 3/2011 | O'Sullivan | |
| 2011/0093941 A1 | 4/2011 | Liu et al. | |
| 2011/0099040 A1 | 4/2011 | Felt et al. | |
| 2011/0125866 A1 | 5/2011 | Williams | |
| 2011/0128568 A1 | 6/2011 | Bhogal et al. | |
| 2011/0136472 A1 | 6/2011 | Rector et al. | |
| 2011/0145089 A1 | 6/2011 | Khunger et al. | |
| 2011/0153189 A1 | 6/2011 | Chiang et al. | |
| 2011/0173681 A1 | 7/2011 | Qureshi et al. | |
| 2011/0179366 A1 | 7/2011 | Chae | |
| 2011/0190009 A1 | 8/2011 | Gerber, Jr. et al. | |
| 2011/0205965 A1 | 8/2011 | Sprigg et al. | |
| 2011/0209221 A1 | 8/2011 | Hanson et al. | |
| 2011/0231092 A1 | 9/2011 | Kuo et al. | |
| 2011/0243553 A1 | 10/2011 | Russell | |
| 2011/0274011 A1 | 11/2011 | Stuempert et al. | |
| 2011/0295899 A1 | 12/2011 | James et al. | |
| 2011/0313804 A1 | 12/2011 | Camp et al. | |
| 2011/0313880 A1 | 12/2011 | Paul et al. | |
| 2012/0016951 A1 | 1/2012 | Li et al. | |
| 2012/0017252 A1 | 1/2012 | Li et al. | |
| 2012/0036345 A1 | 2/2012 | Chen et al. | |
| 2012/0054841 A1 | 3/2012 | Schultz et al. | |
| 2012/0084247 A1 | 4/2012 | Aguera y Arcas et al. | |
| 2012/0089465 A1 | 4/2012 | Froloff | |
| 2012/0096080 A1 | 4/2012 | Levesque et al. | |
| 2012/0101952 A1 | 4/2012 | Raleigh et al. | |
| 2012/0117232 A1 | 5/2012 | Brown et al. | |
| 2012/0143662 A1 | 6/2012 | Heath | |
| 2012/0179764 A1 | 7/2012 | Erdal | |
| 2012/0185912 A1 | 7/2012 | Lee et al. | |
| 2012/0197852 A1 | 8/2012 | Dutta et al. | |
| 2012/0209923 A1 | 8/2012 | Mathur et al. | |
| 2012/0222083 A1 | 8/2012 | Vaha-Sipila et al. | |
| 2012/0252498 A1 | 10/2012 | Trinchero et al. | |
| 2012/0291101 A1 | 11/2012 | Ahlstrom et al. | |
| 2012/0293465 A1 | 11/2012 | Nandu et al. | |
| 2012/0296455 A1 | 11/2012 | Ohnemus et al. | |
| 2012/0317565 A1 | 12/2012 | Carrara et al. | |
| 2013/0014212 A1 | 1/2013 | Cohen | |
| 2013/0046632 A1 | 2/2013 | Grigg et al. | |
| 2013/0054139 A1 | 2/2013 | Bodin et al. | |
| 2013/0059698 A1 | 3/2013 | Barton | |
| 2013/0110854 A1 | 5/2013 | Lockhart et al. | |
| 2013/0124546 A1 | 5/2013 | Wormley et al. | |
| 2013/0179244 A1 | 7/2013 | Laffoon et al. | |
| 2013/0179988 A1 | 7/2013 | Bekker et al. | |
| 2013/0218704 A1 | 8/2013 | Duncan et al. | |
| 2013/0219461 A1 | 8/2013 | Esaki et al. | |
| 2013/0232573 A1 | 9/2013 | Saidi et al. | |
| 2013/0263000 A1 | 10/2013 | Lucas et al. | |
| 2013/0263206 A1 | 10/2013 | Nefedov et al. | |
| 2013/0268378 A1 | 10/2013 | Yovin | |
| 2013/0282227 A1 | 10/2013 | Chen et al. | |
| 2013/0290359 A1 | 10/2013 | Eronen et al. | |
| 2013/0318627 A1 | 11/2013 | Lundkvist et al. | |
| 2013/0339234 A1 | 12/2013 | Prakash et al. | |
| 2014/0006616 A1 | 1/2014 | Aad et al. | |
| 2014/0031959 A1 | 1/2014 | Glode et al. | |
| 2014/0047062 A1 | 2/2014 | Krueger et al. | |
| 2014/0059695 A1 | 2/2014 | Parecki et al. | |
| 2014/0074570 A1 | 3/2014 | Hope et al. | |
| 2014/0078304 A1 | 3/2014 | Othmer | |
| 2014/0122890 A1 | 5/2014 | Prot | |
| 2014/0195349 A1 | 7/2014 | Muster et al. | |
| 2015/0222641 A1 | 8/2015 | Lu et al. | |

OTHER PUBLICATIONS

PCT International Search Report; International App. No. PCT/US14/19562; dated Jun. 10, 2014; pp. 1-2.

Holder, Joseph; "BlackBerry 101—Application permissions"; bearing a date of Dec. 31, 2010; printed on Sep. 28, 2016; pp. 1-6.

Extended European Search Report; European App. No. EP 14 75 7393; dated Oct. 13, 2016 (received by our Agent on Oct. 14, 2016); pp. 1-8.

Tasker; "Total Automation for Android"; User Guide, Jul. 5, 2012; 14 pages; located at: http://tasker.dinglisch.net/.

Beresford et al.; "MockDroid: trading privacy for application functionality on smartphones"; Hotmobile '11; Mar. 1-3, 2011; pp. 49-54.

(56) References Cited

OTHER PUBLICATIONS

Hildenbrand, Jerry; "Android app permissions-How Google gets it right . . . "; bearing a date of Feb. 2012; printed on Apr. 1, 2017; pp. 1-22; located at: http://www.androidcentral.com/android-permissions-privacy-security.

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

\* cited by examiner

FIGURE 1

| Fig. 1A | Fig. 1B | Fig. 1C | Fig. 1D | Fig. 1E | Fig. 1F |
|---|---|---|---|---|---|
| Fig. 1G | Fig. 1H | Fig. 1I | Fig. 1J | Fig. 1K | Fig. 1L |
| Fig. 1M | Fig. 1N | Fig. 1O | Fig. 1P | Fig. 1Q | Fig. 1R |
| Fig. 1S | Fig. 1T | Fig. 1U | Fig. 1V | Fig. 1W | Fig. 1X |
| Fig. 1Y | Fig. 1Z | Fig. 1AA | Fig. 1AB | Fig. AC | Fig. 1AD |
| Fig. 1AE | Fig. 1AF | Fig. 1AG | Fig. 1AH | Fig. 1AI | Fig. 1AJ |

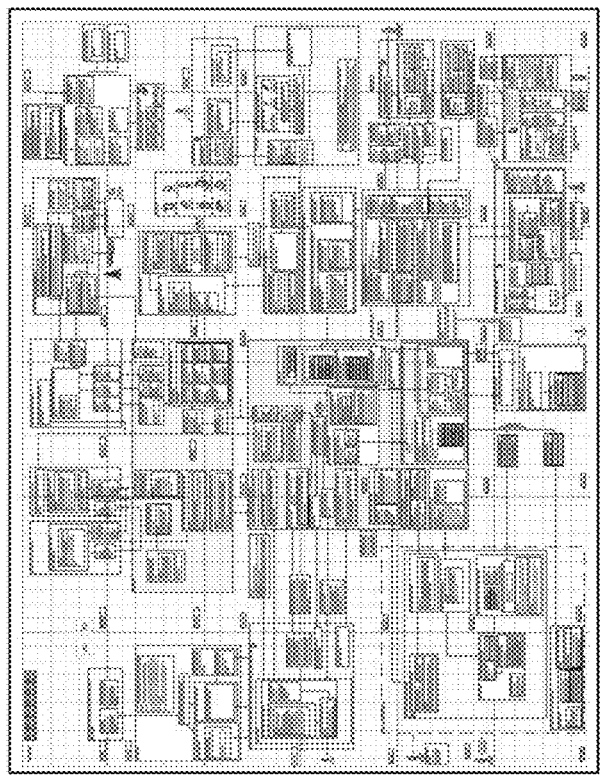

146 Device Specification Information made available by device manufacturers

| 146A Public Information made available by device | 146B non-public device Information stored and recorded by device |

FIG. 1A

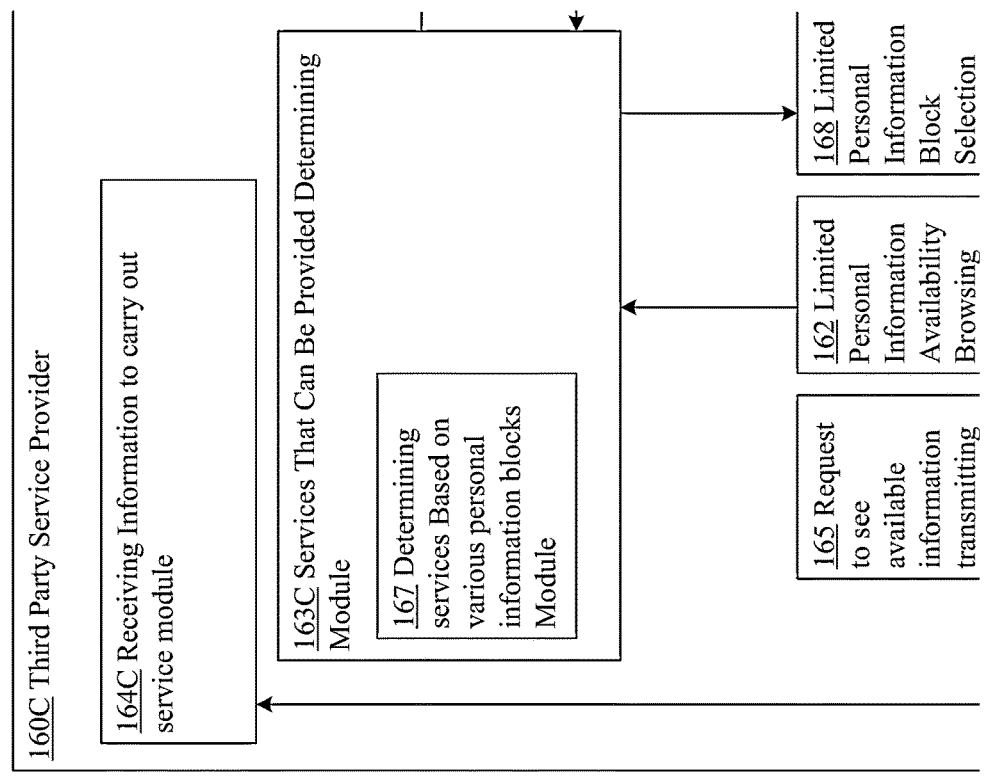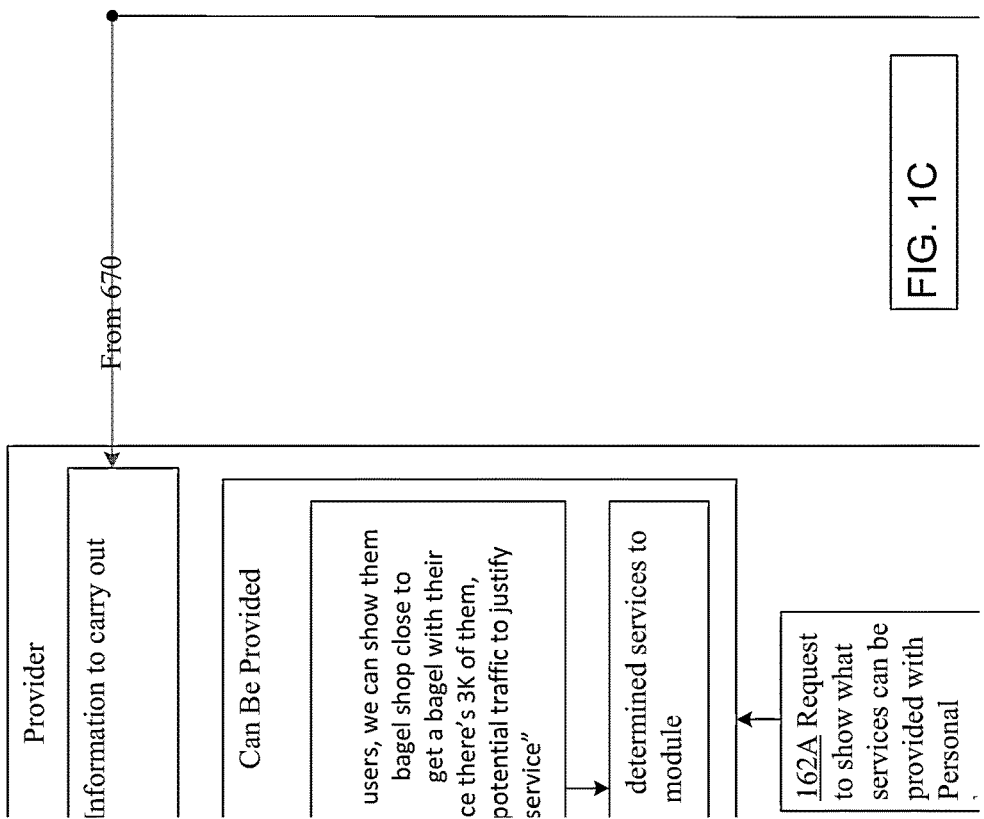
FIG. 1C

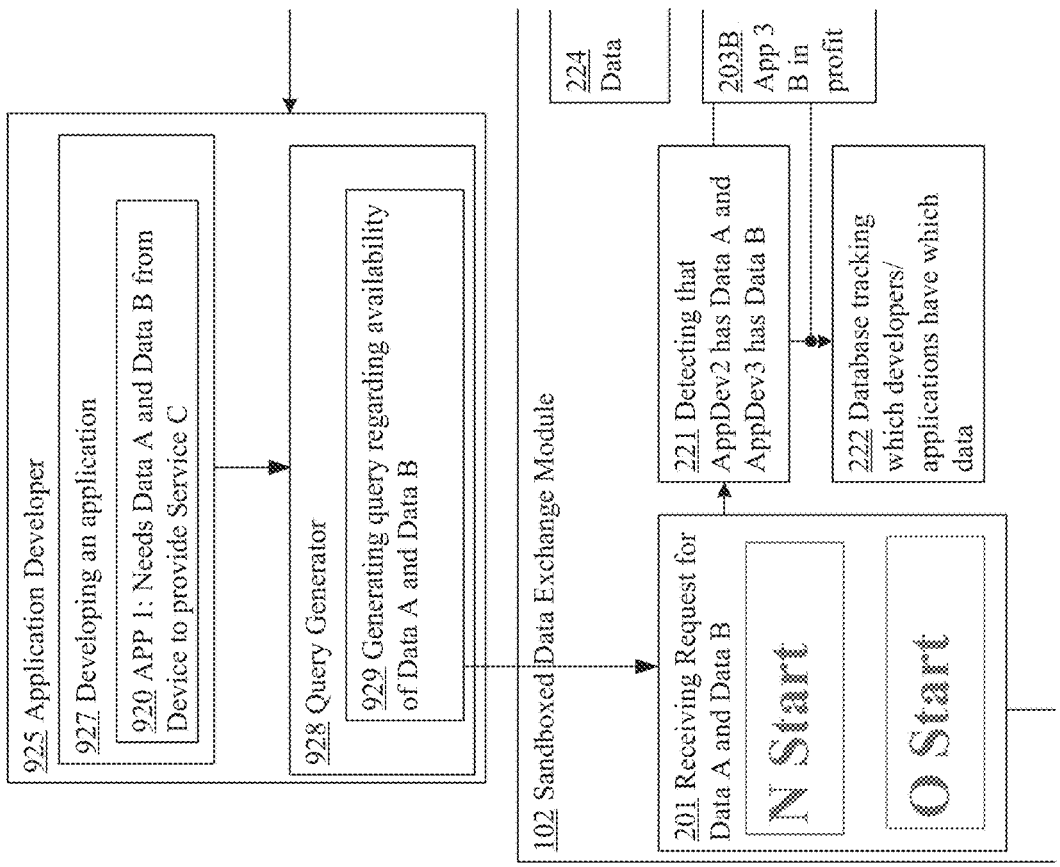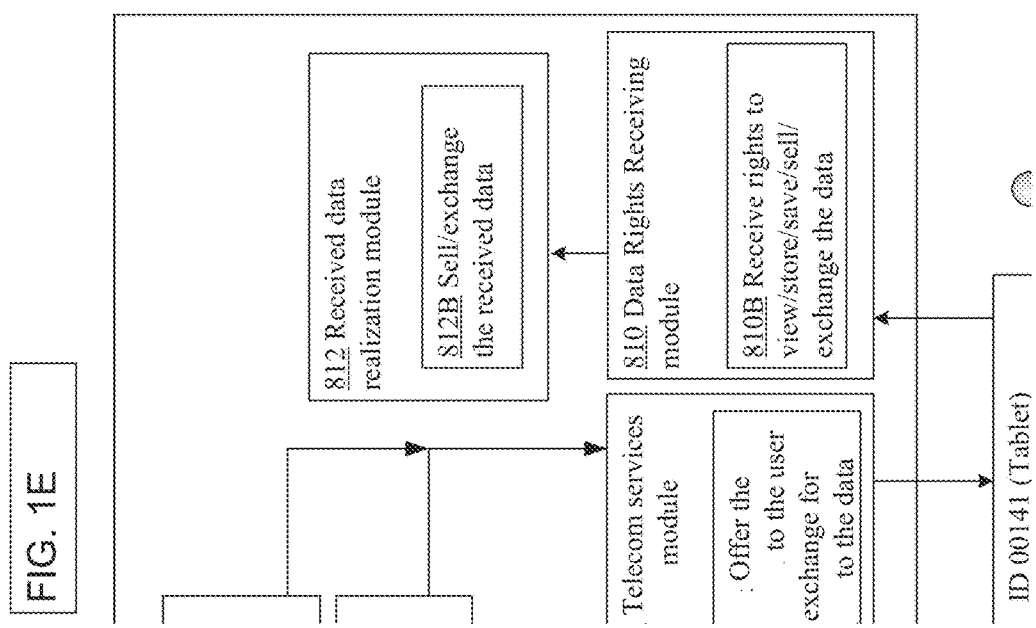
FIG. 1E

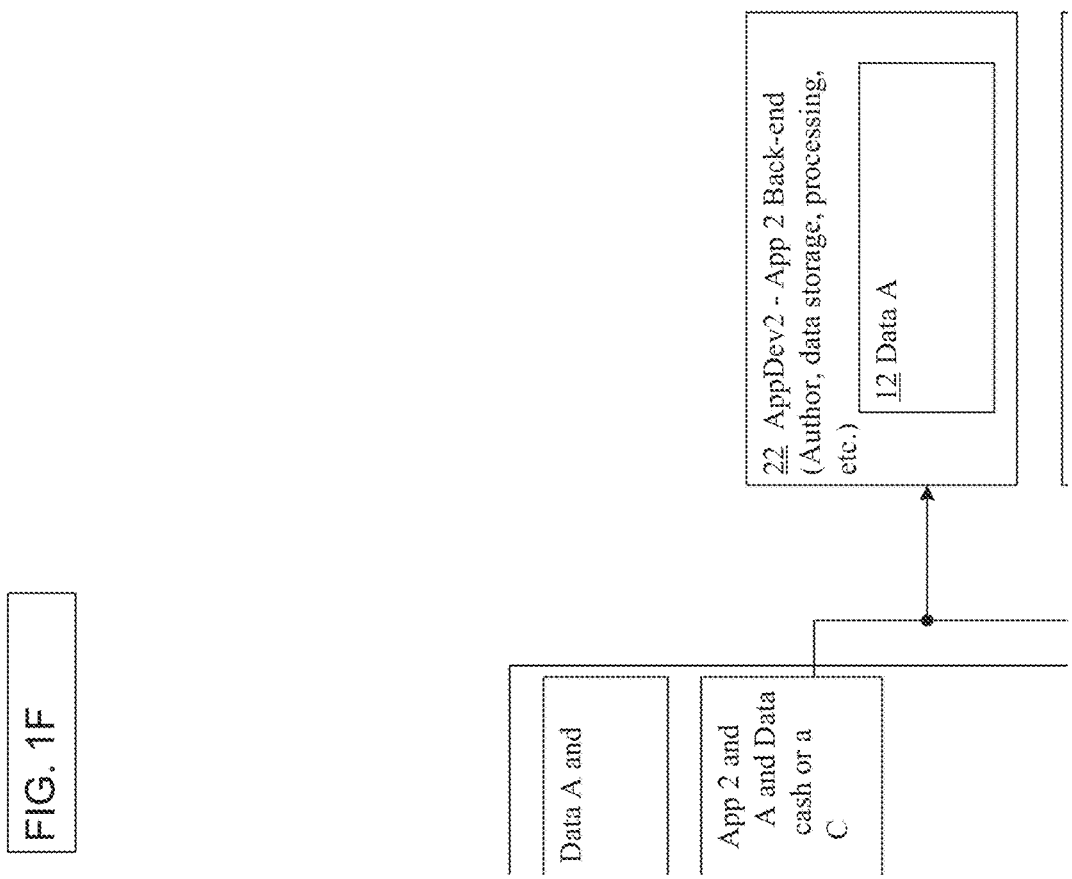

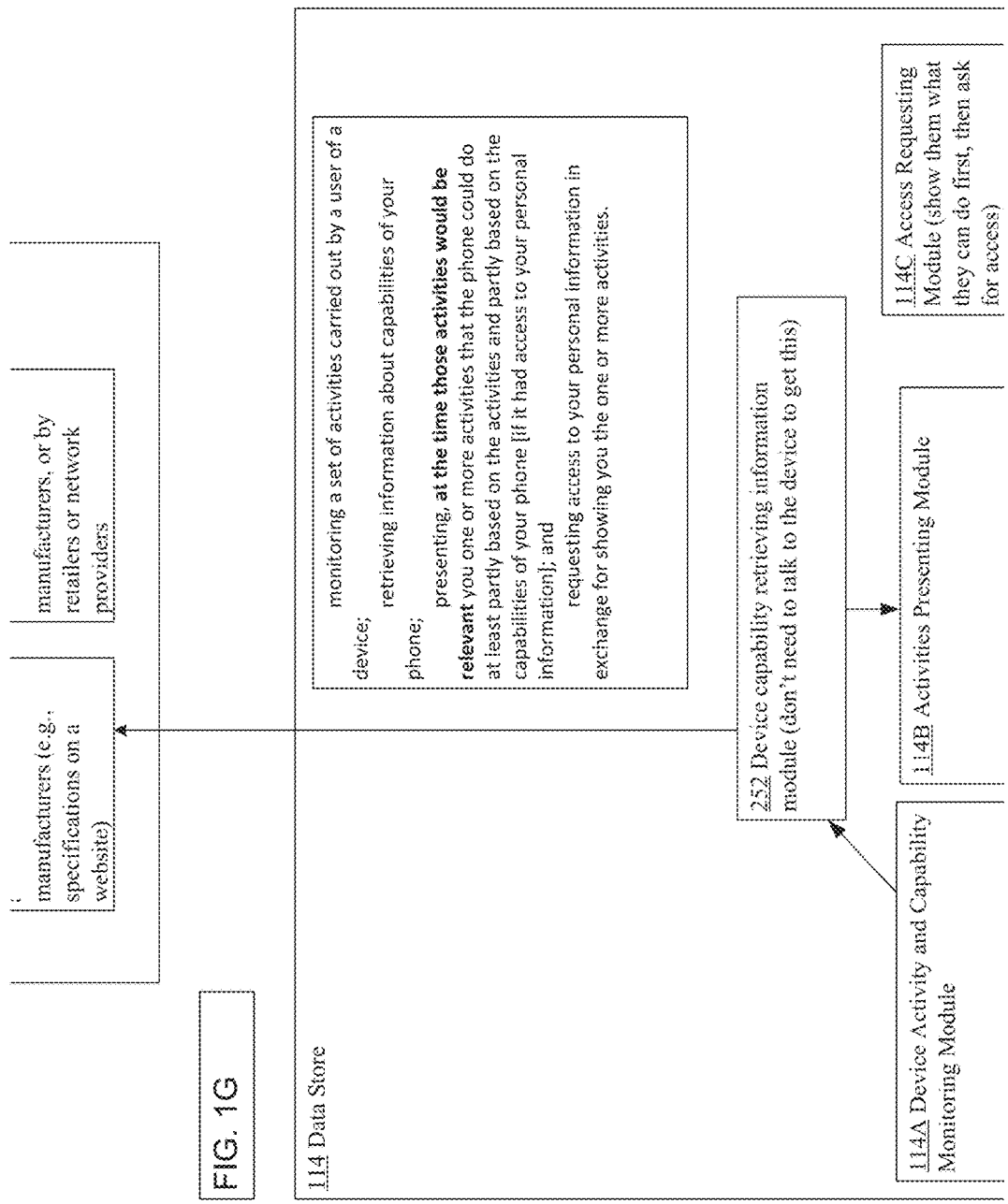

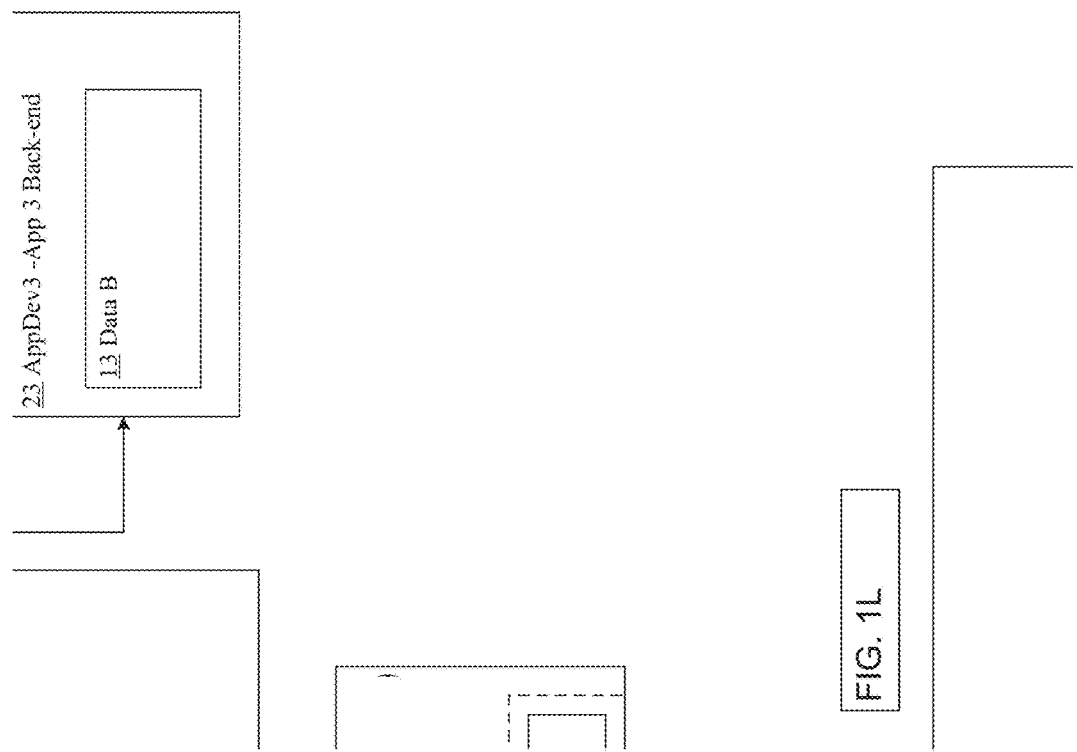

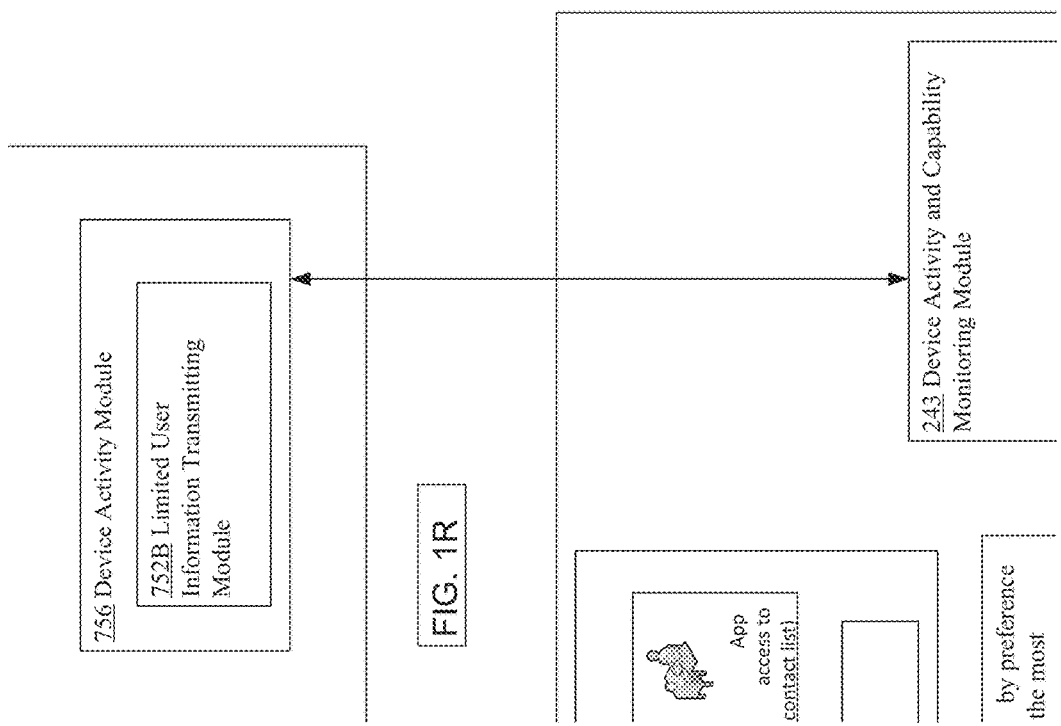

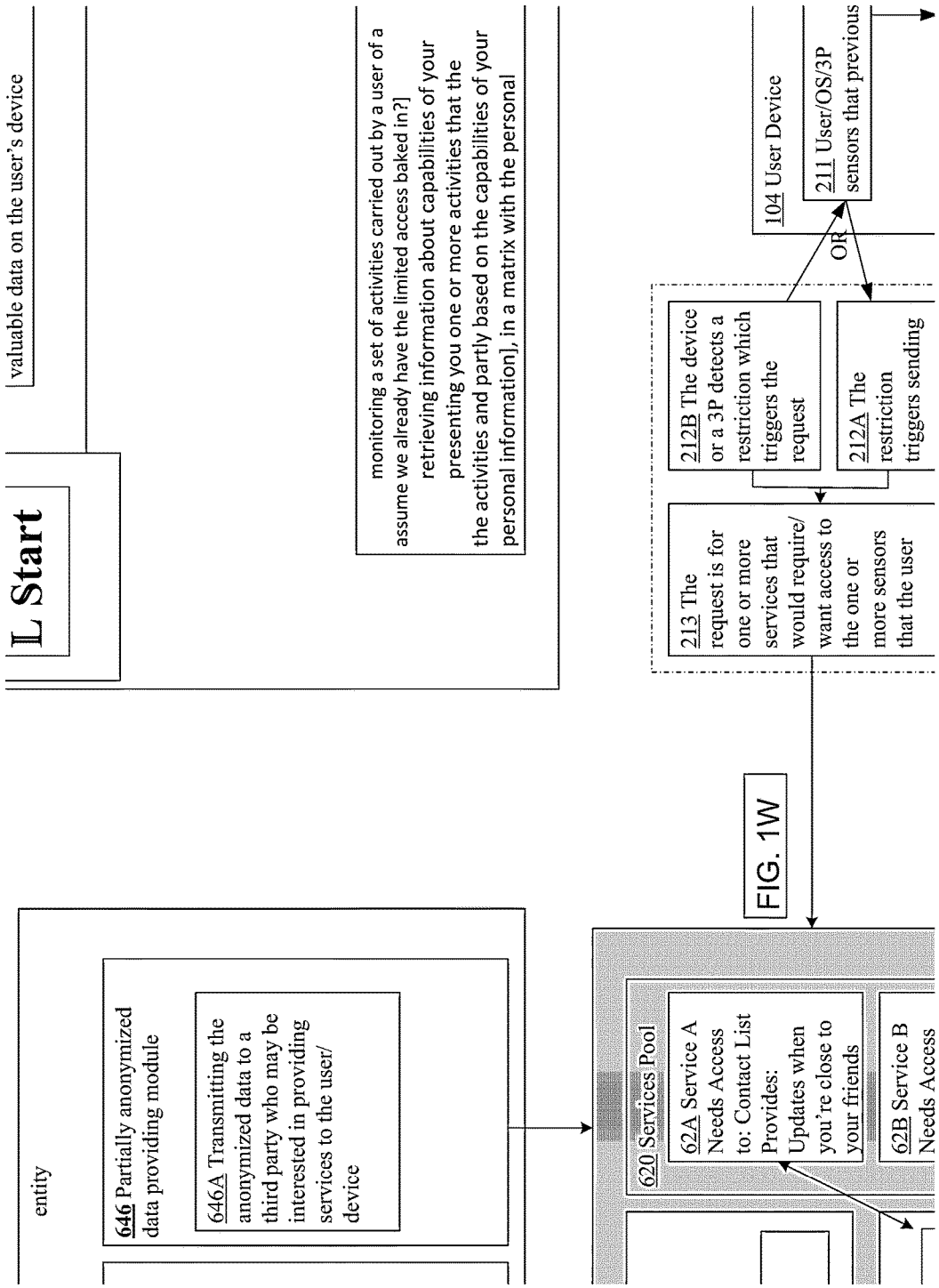

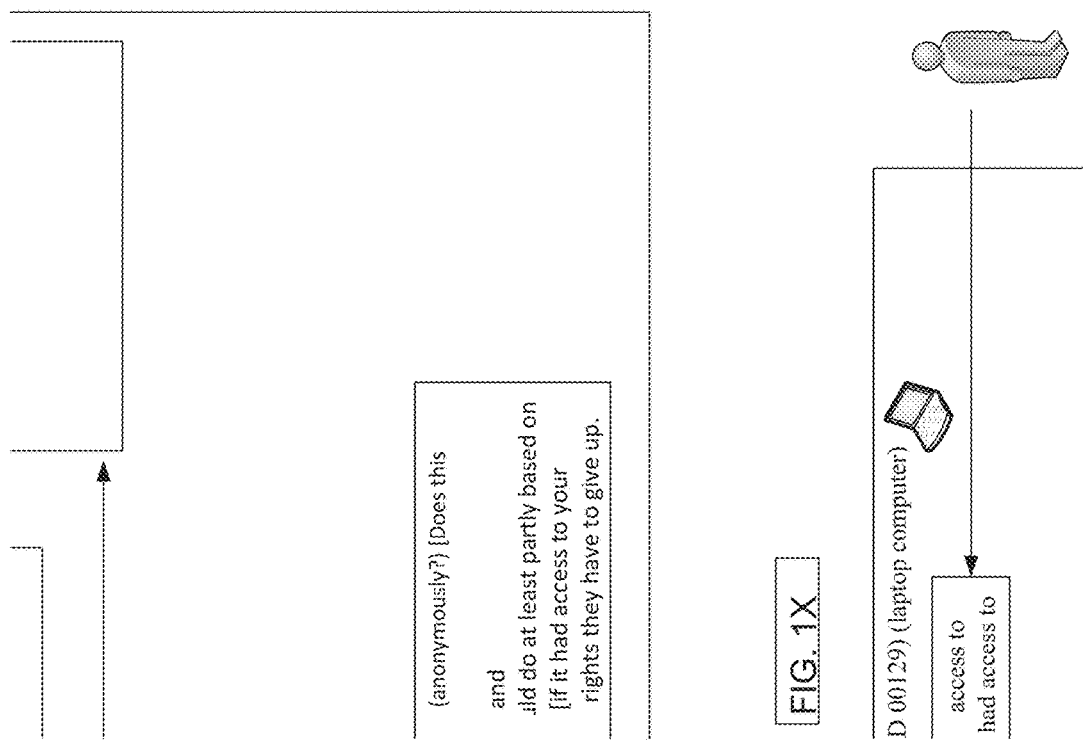

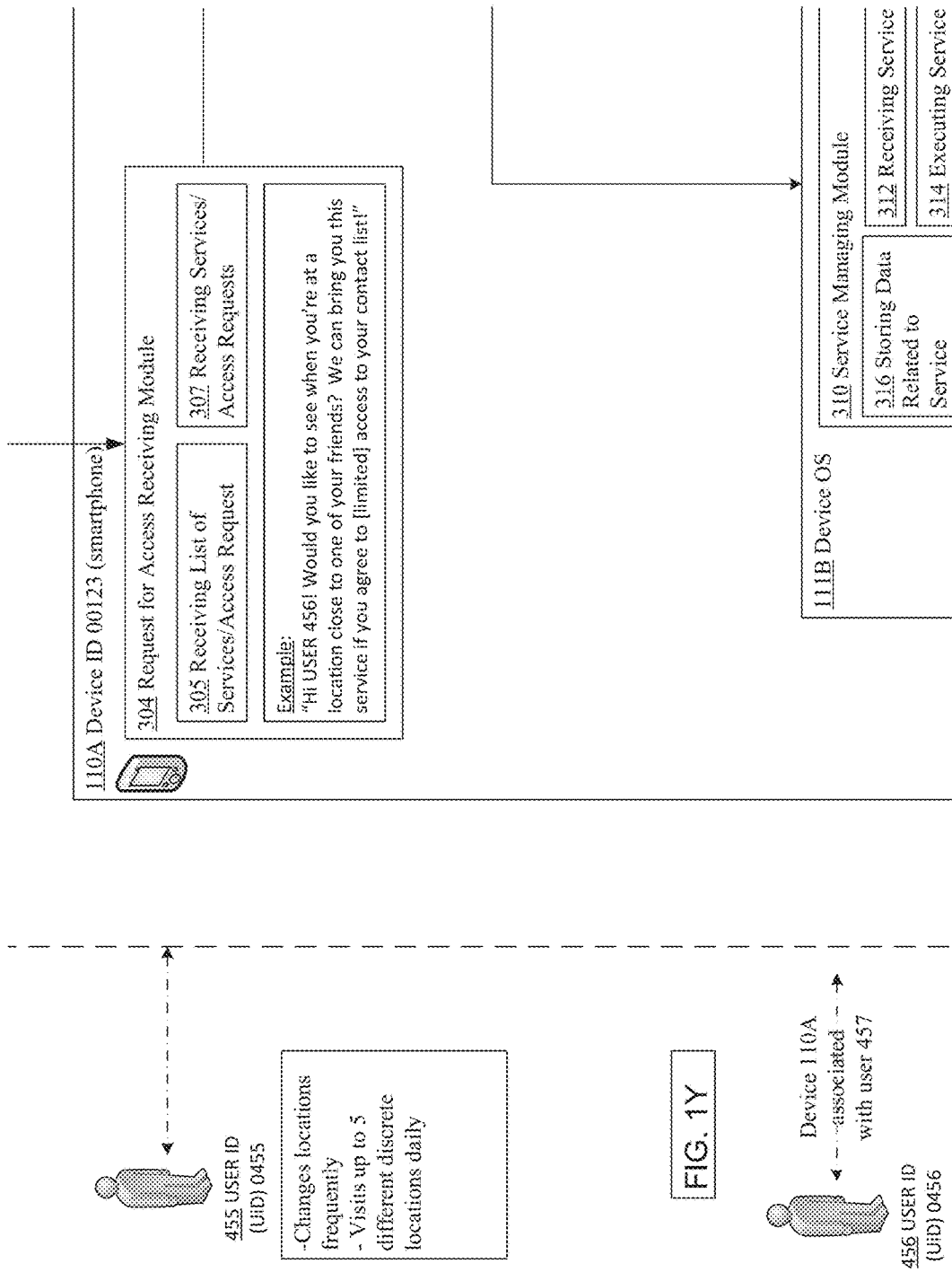

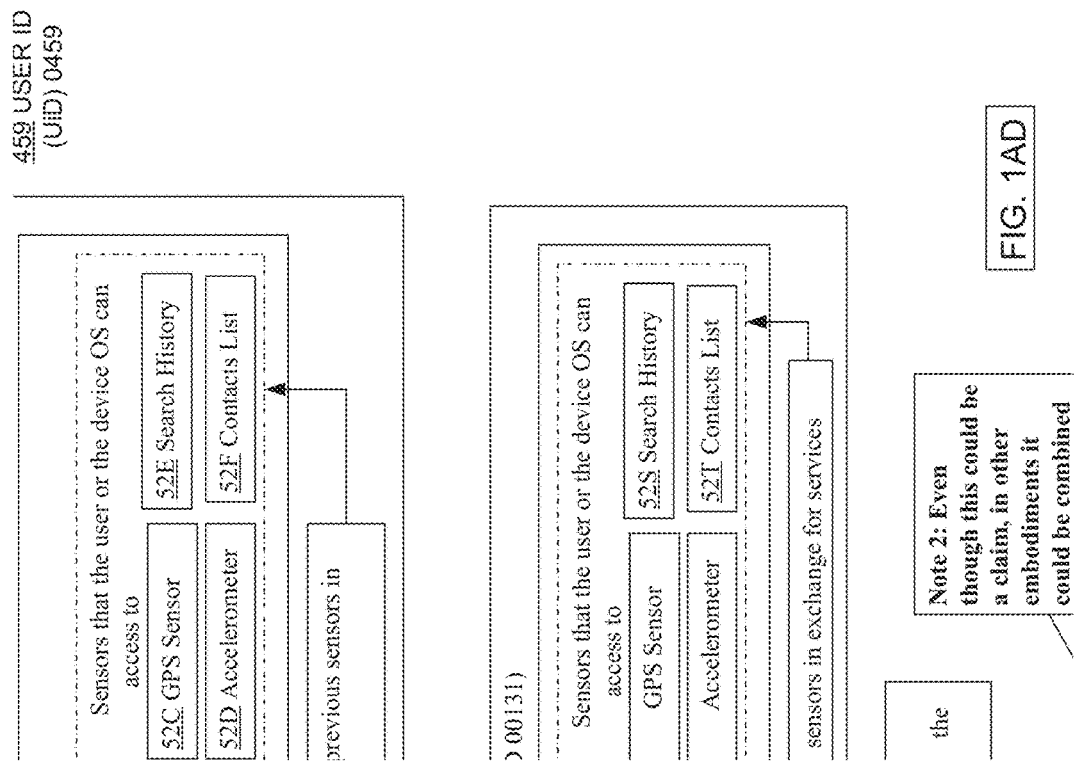

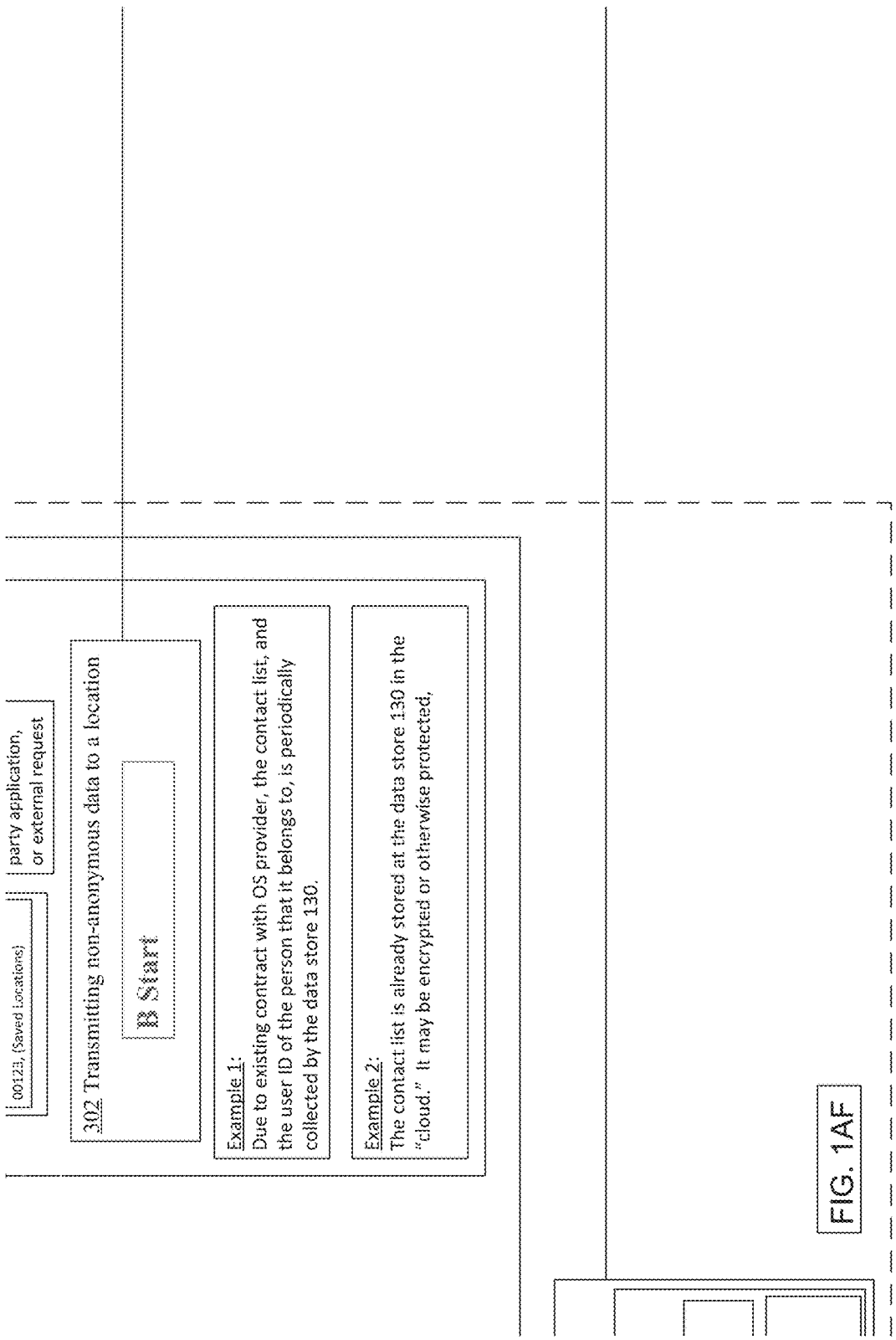

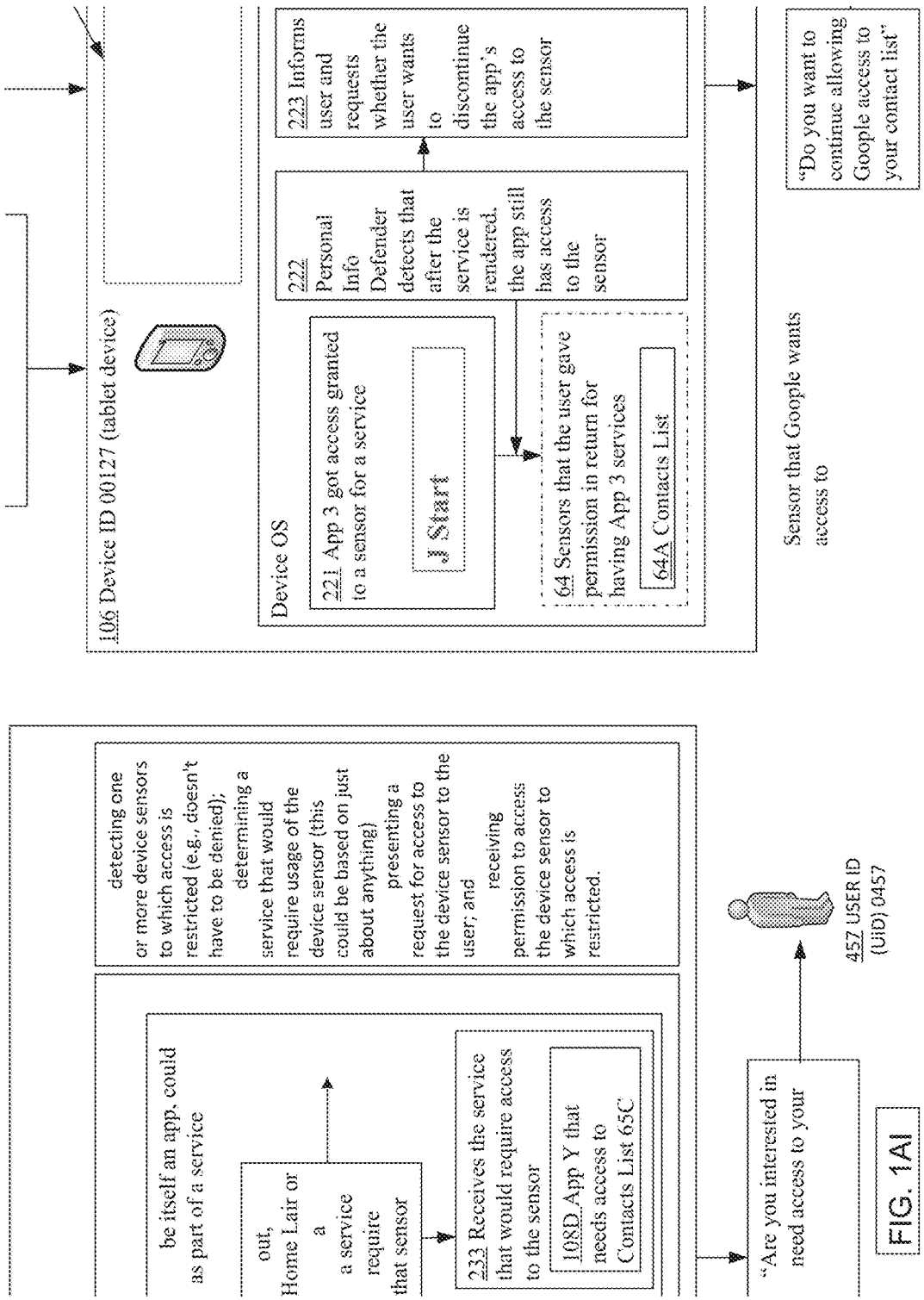

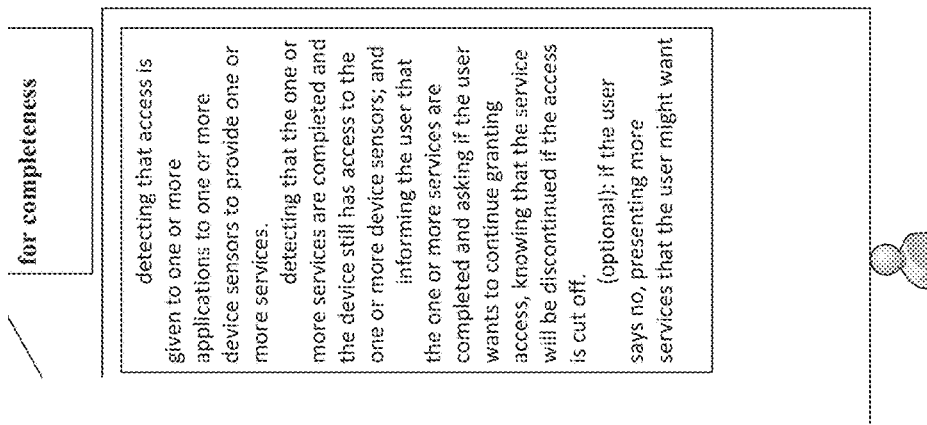

METHODS AND SYSTEMS FOR DATA SERVICES

CROSS-REFERENCE TO RELATED APPLICATIONS

If an Application Data Sheet (ADS) has been filed with this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

TABLE 1

Alignment of drawings.

Figure 1B:
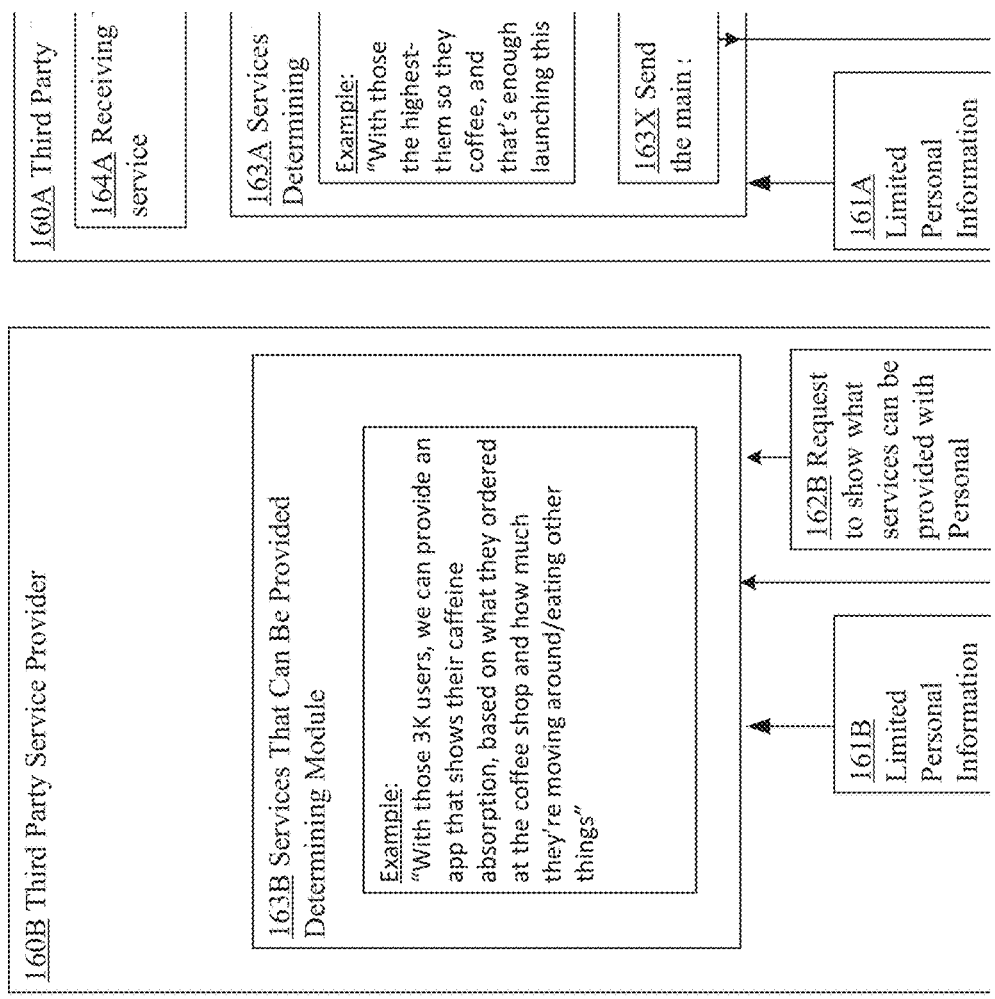
FIG. 1, including FIGS. 1A to 1AJ shows a partially schematic diagram of an environment(s) and/or an implementation(s) of technologies described herein. The figures are ordered alphabetically, first by increasing column from left to right, then by increasing row from top to bottom, as shown in the following table.
Figure 1D:
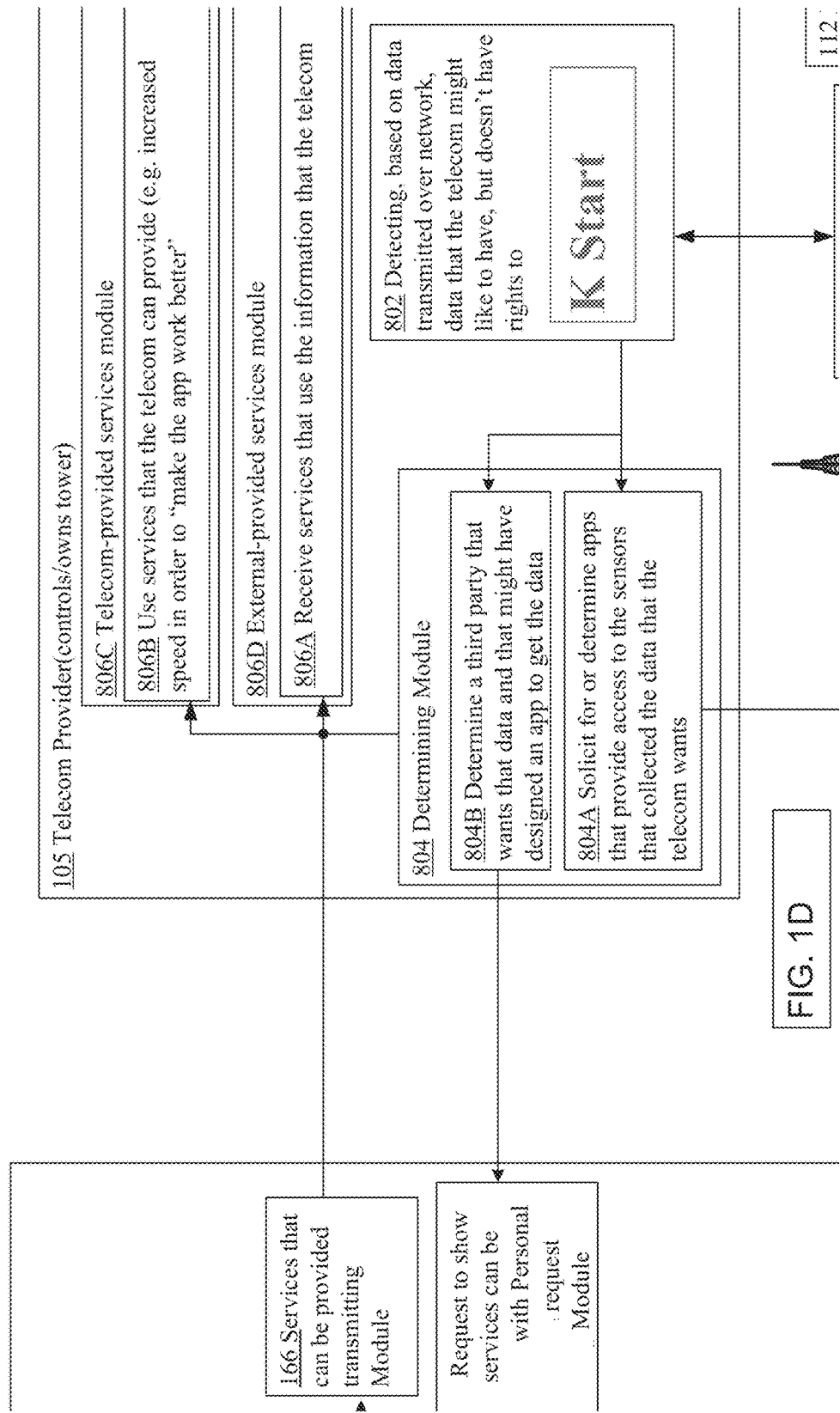
Figure 1H:
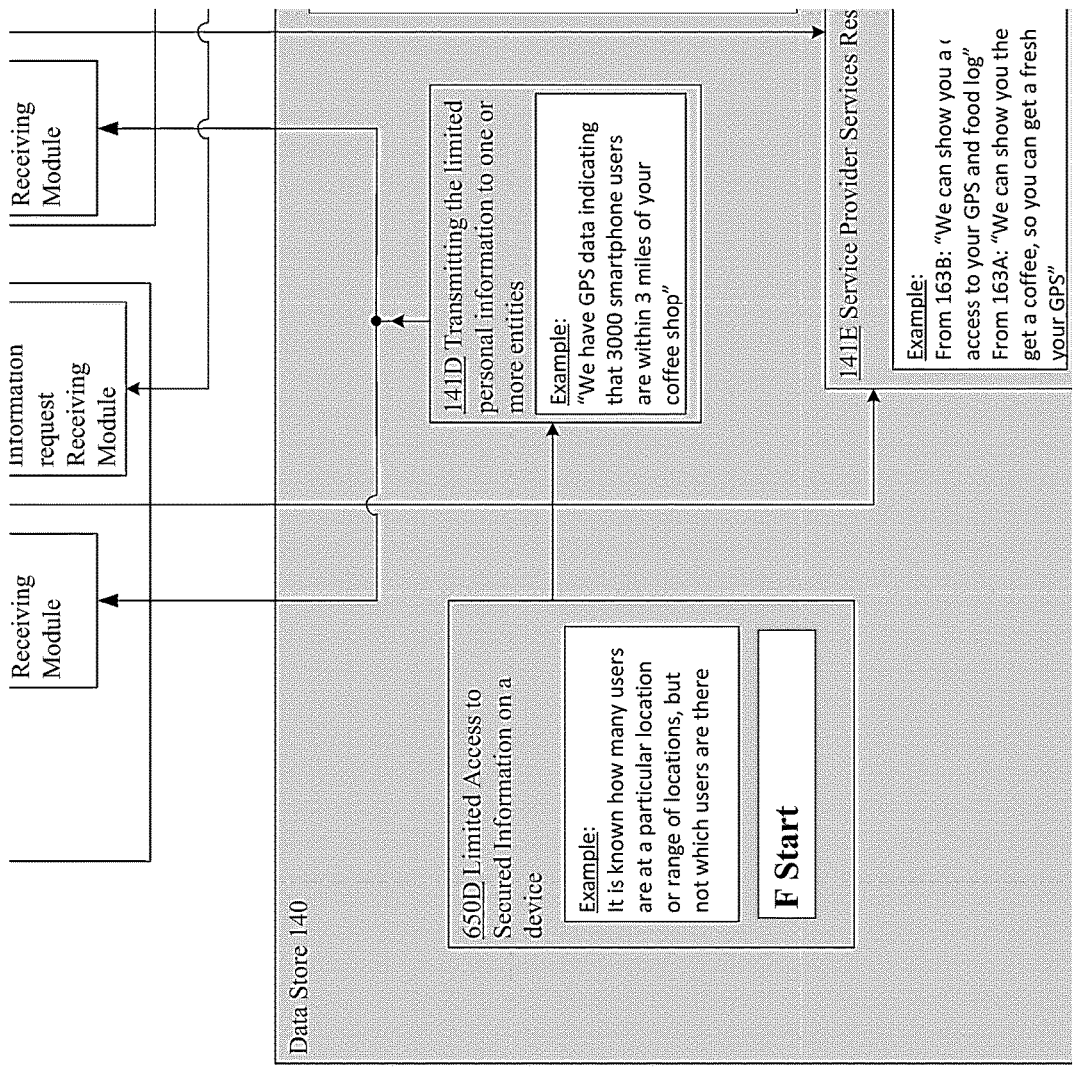
Figure 1I:
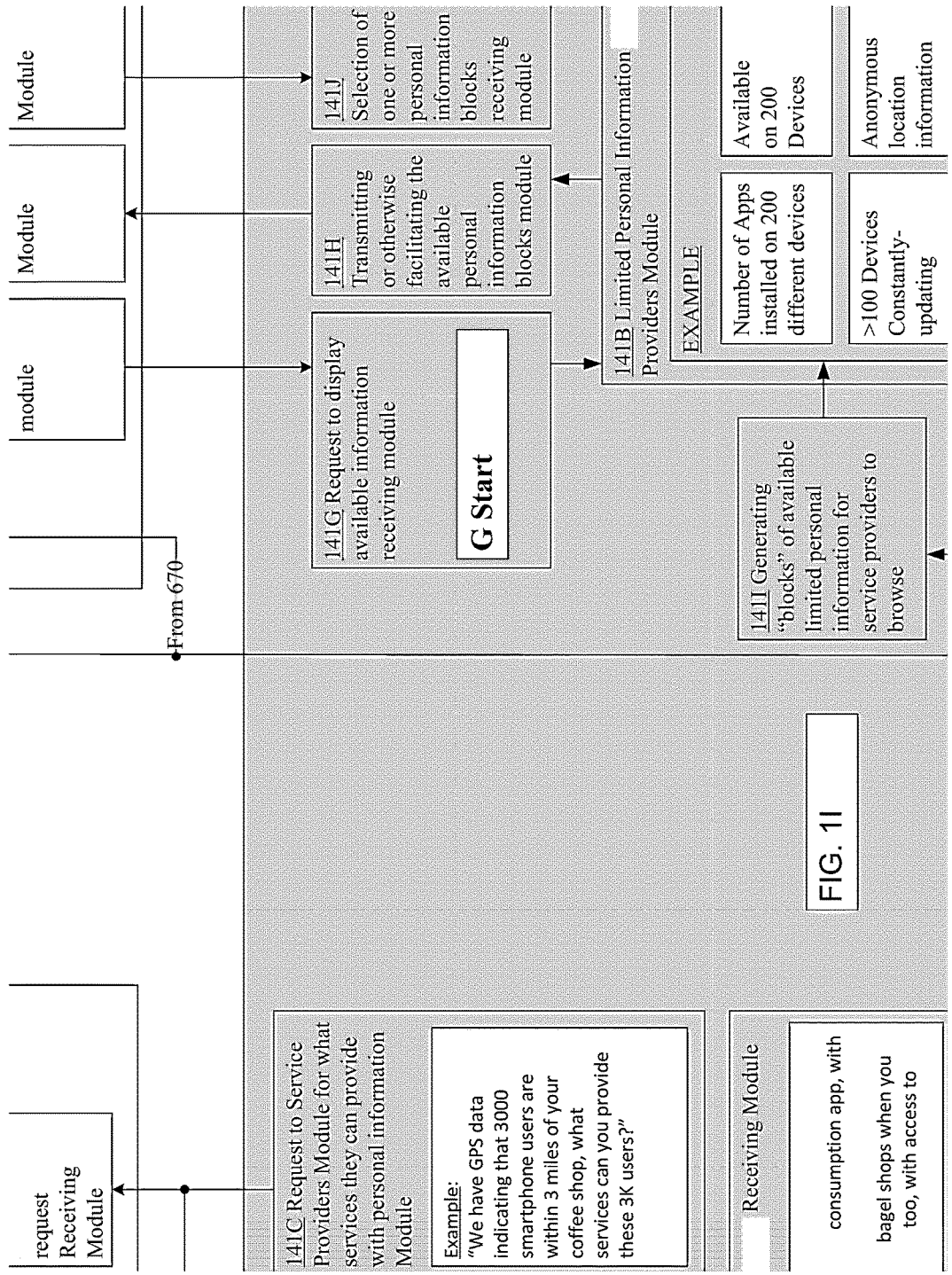
Figure 1J:
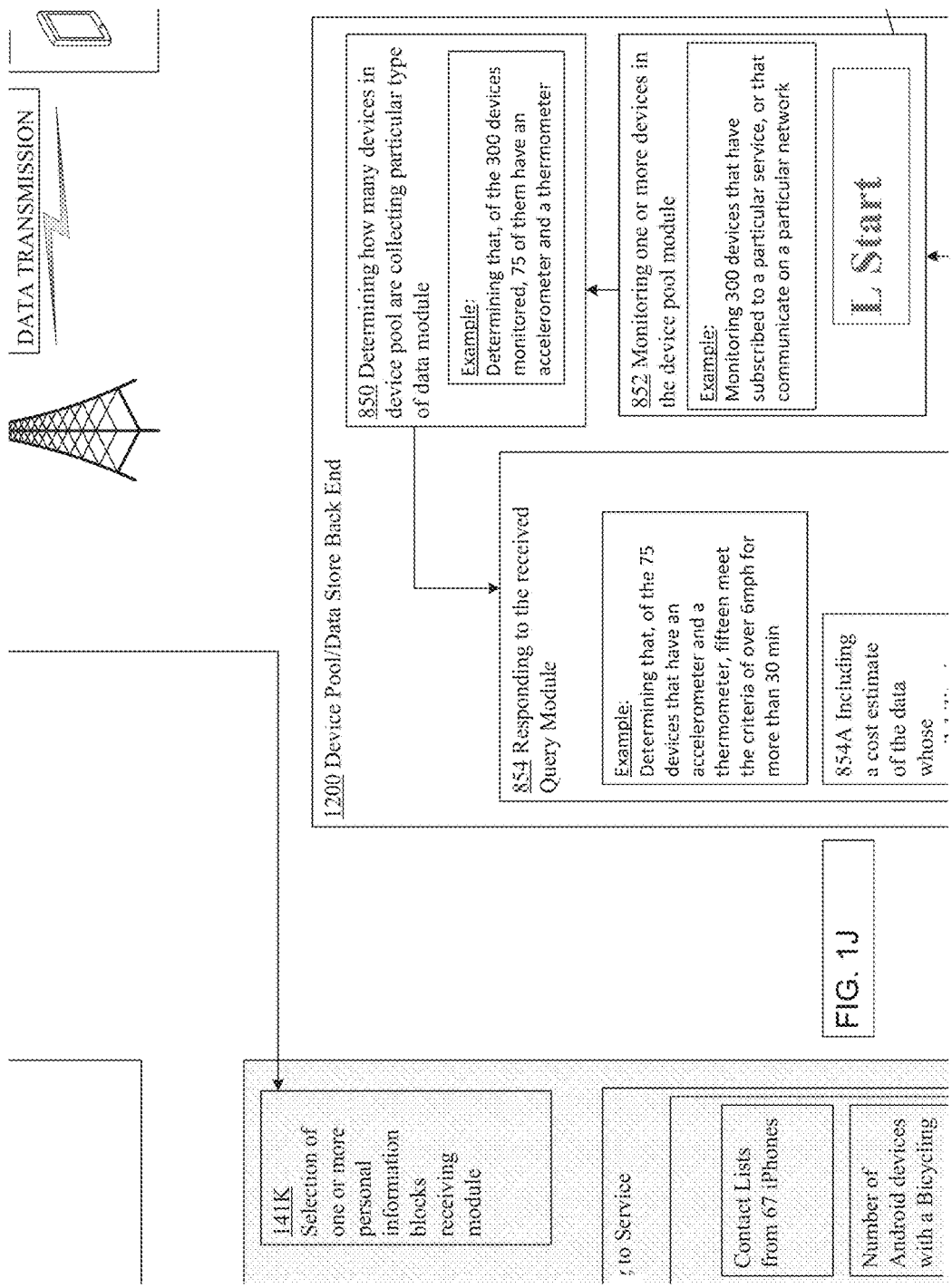
Figure 1K:
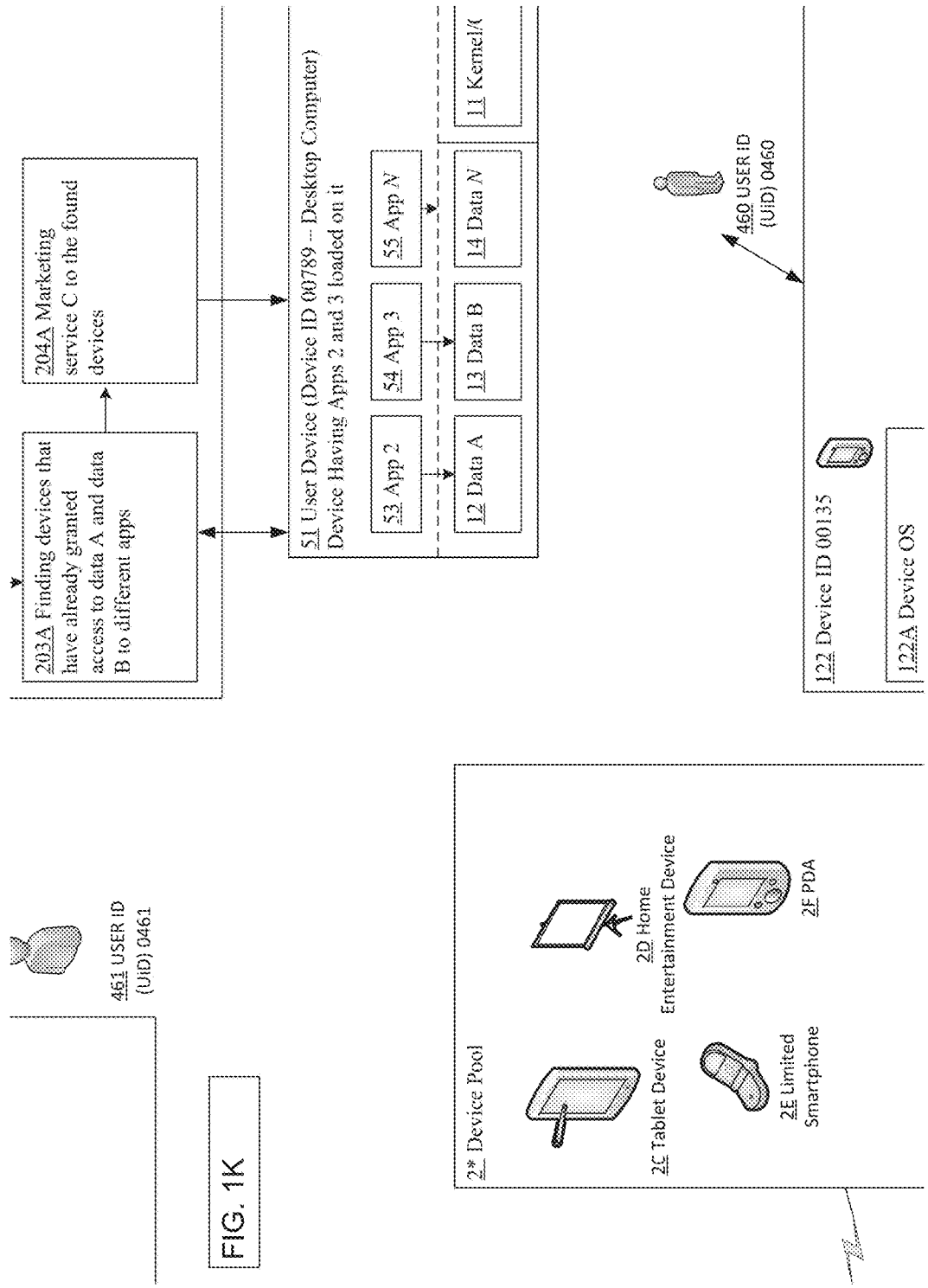
Figure 1M:
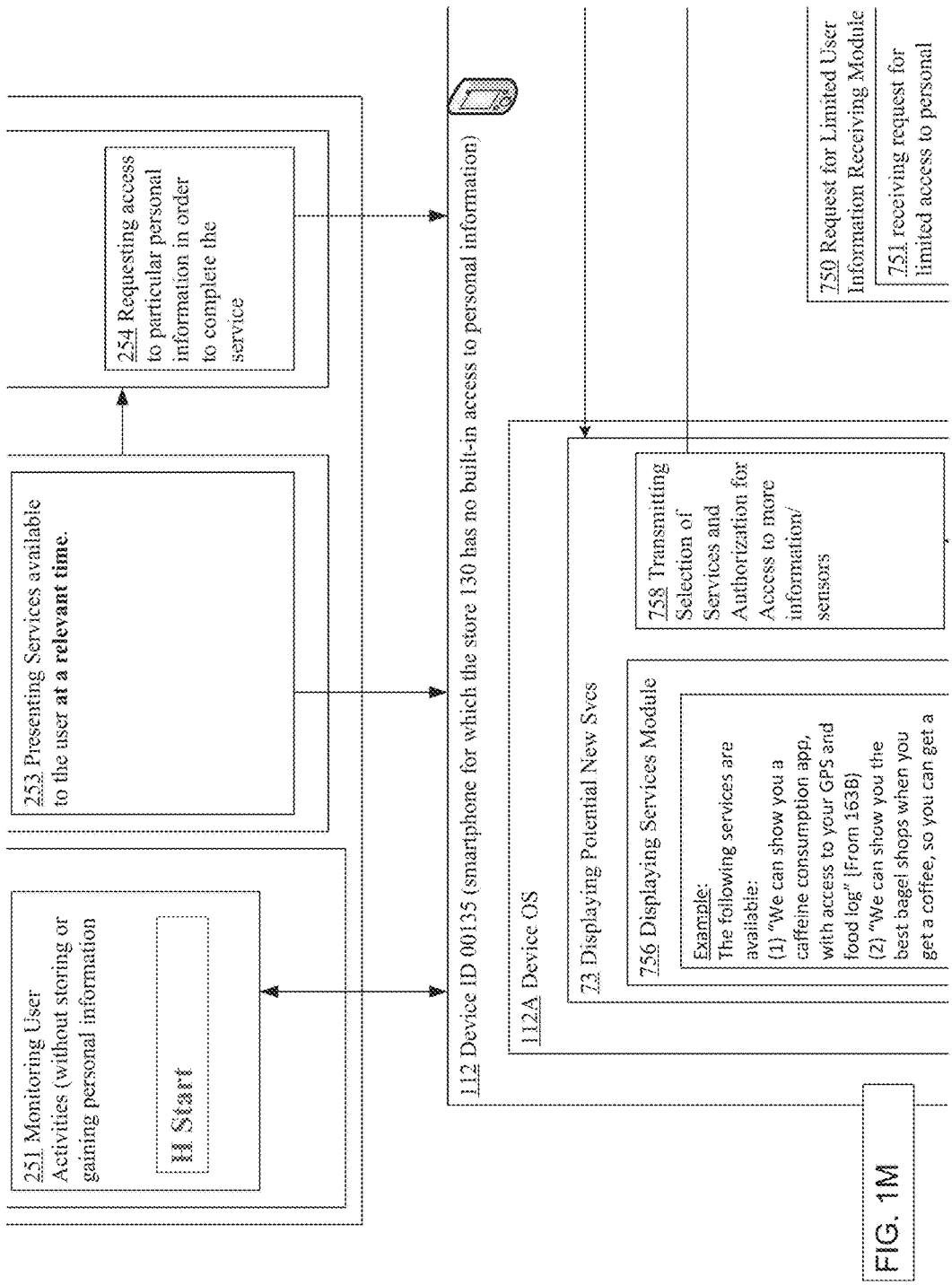
Figure 1N:
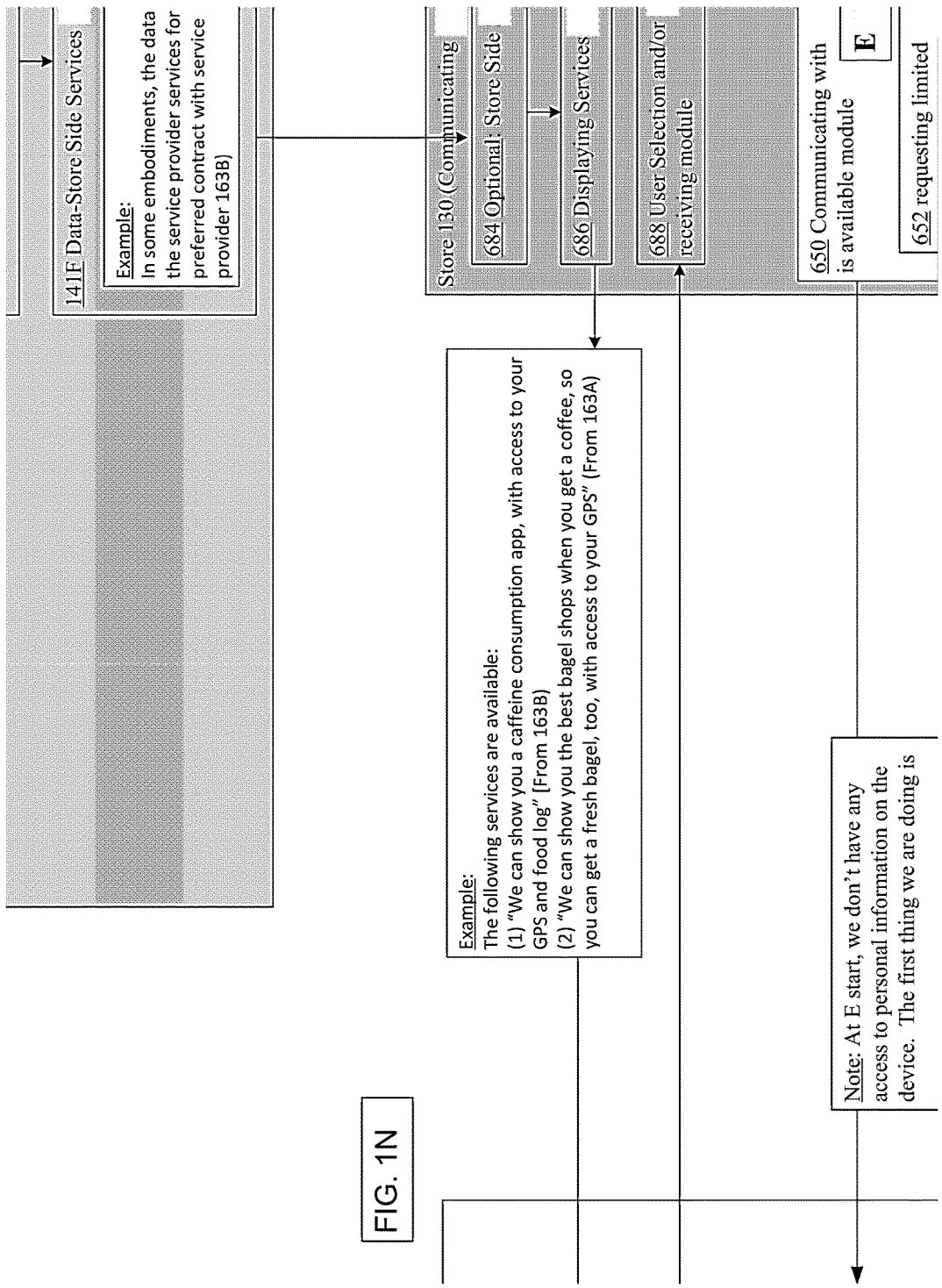
Figure 10:
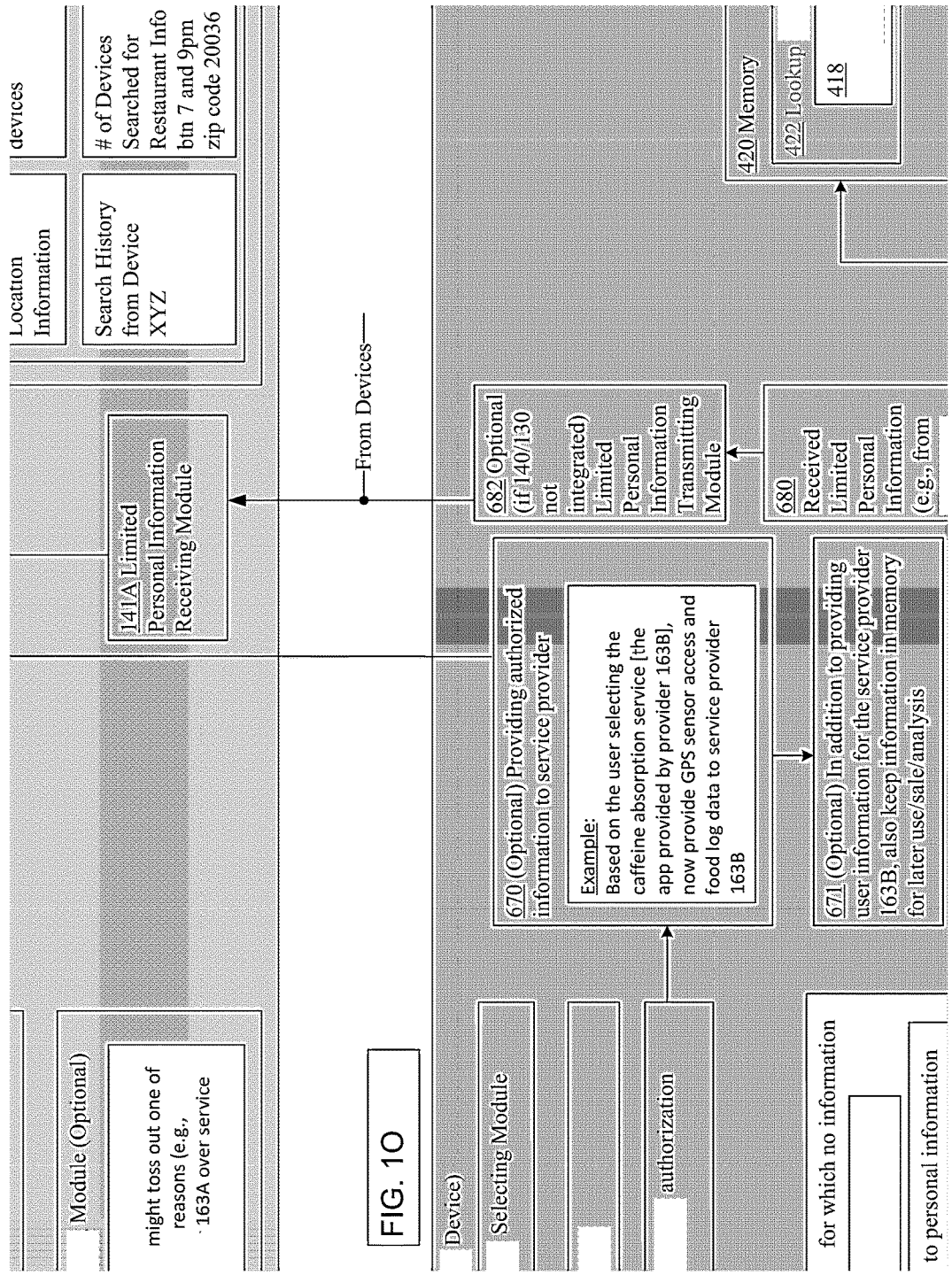
Figure 1P:
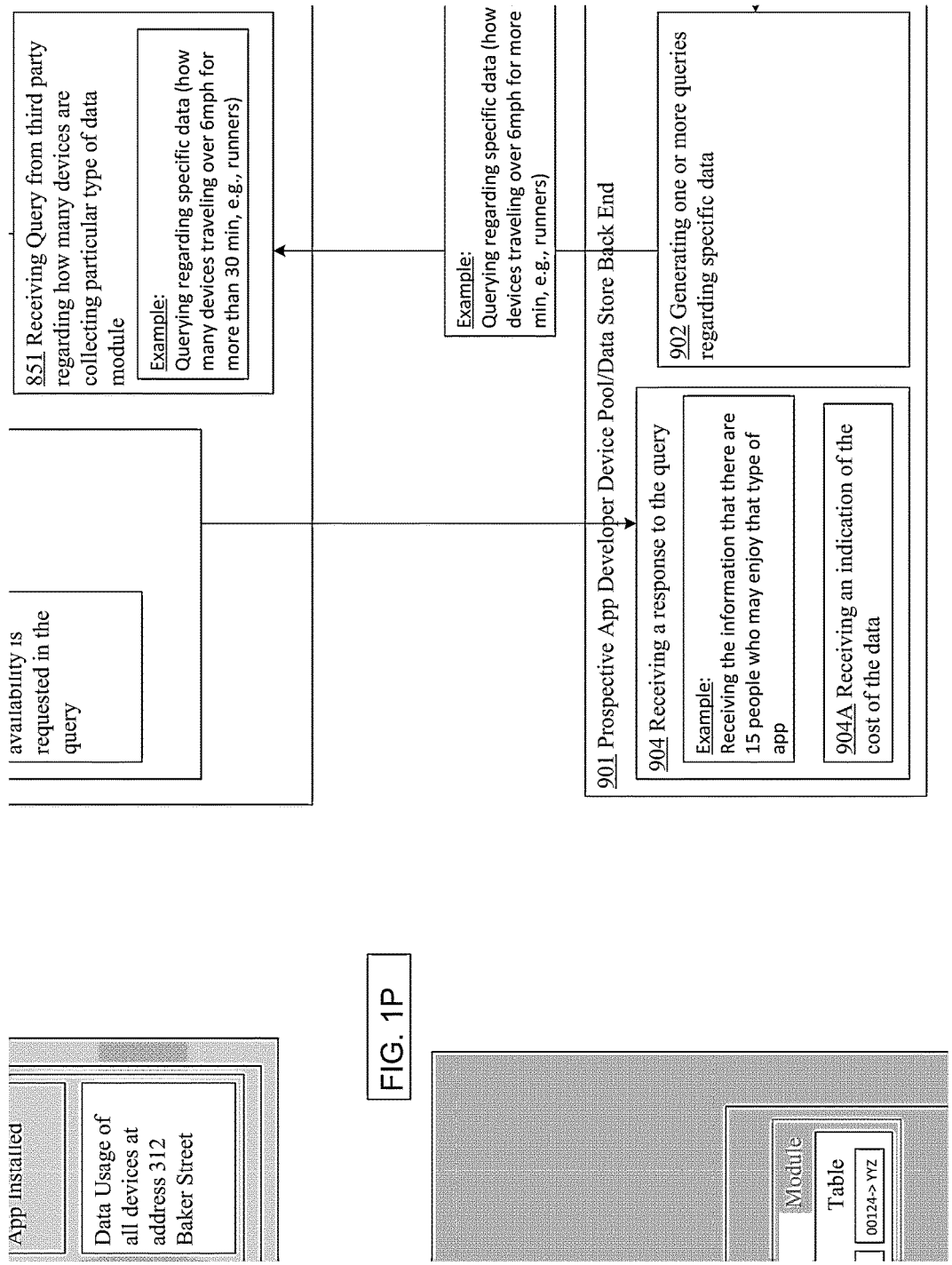
Figure 1Q:
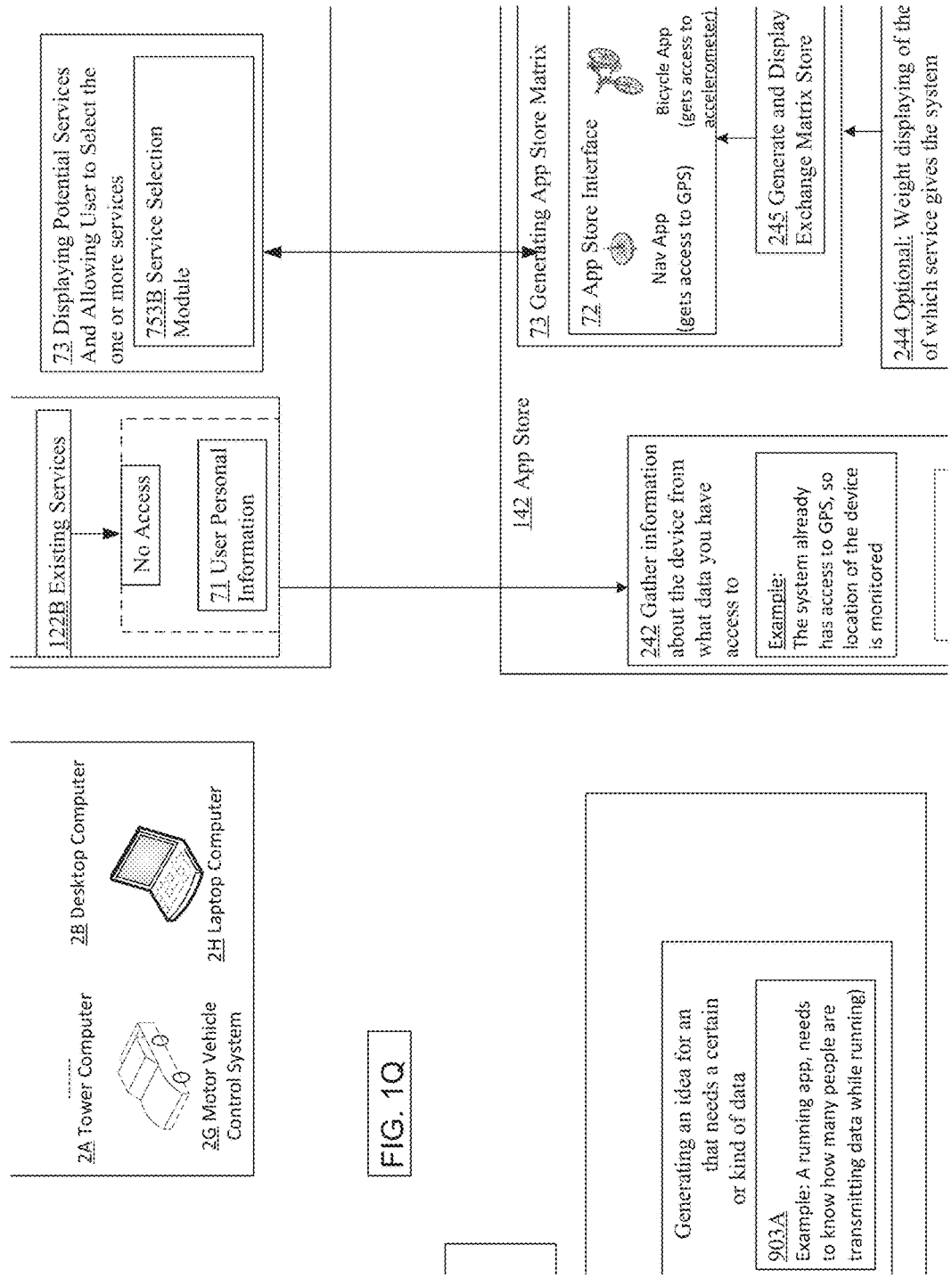
Figure 1S:
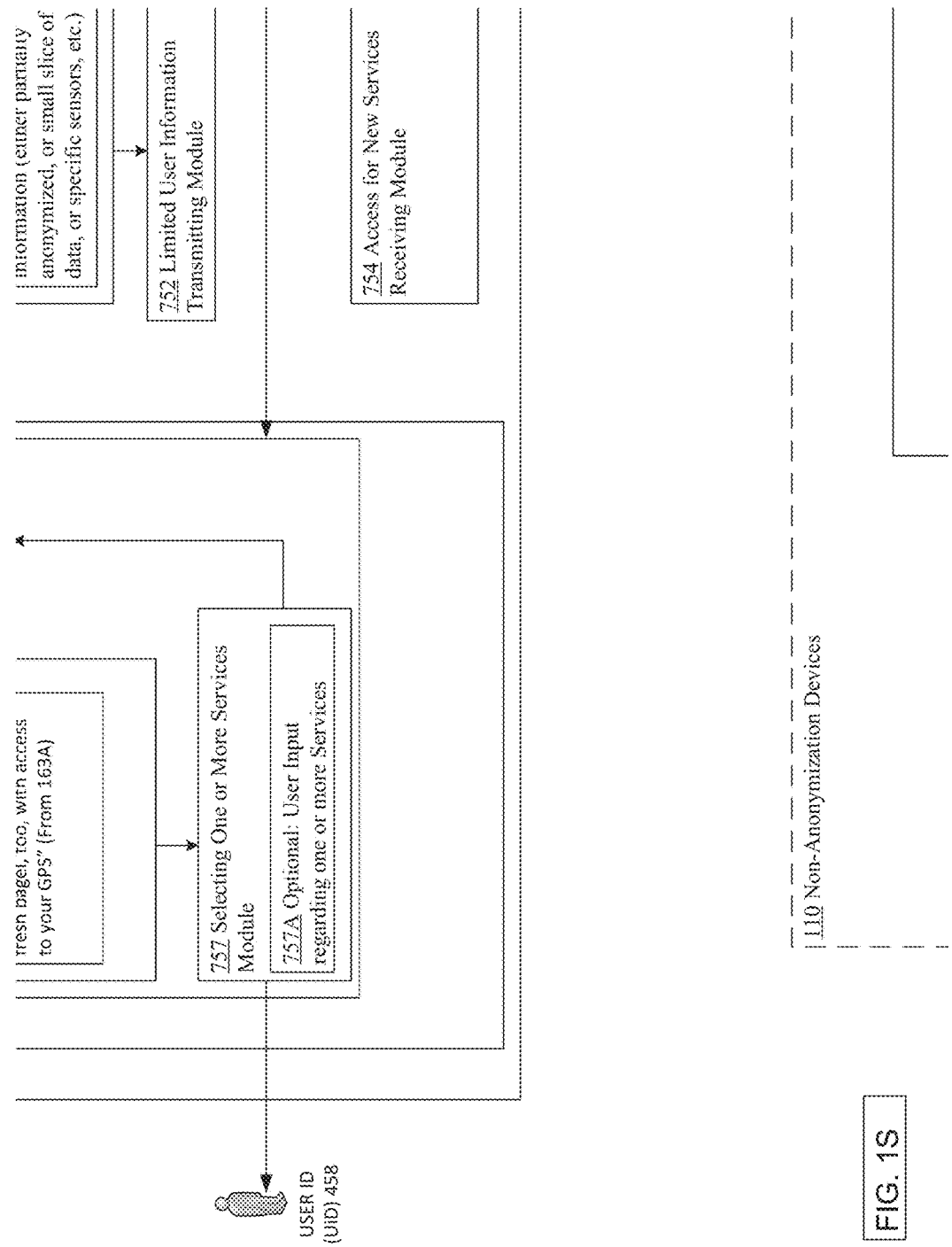
Figure 1T:
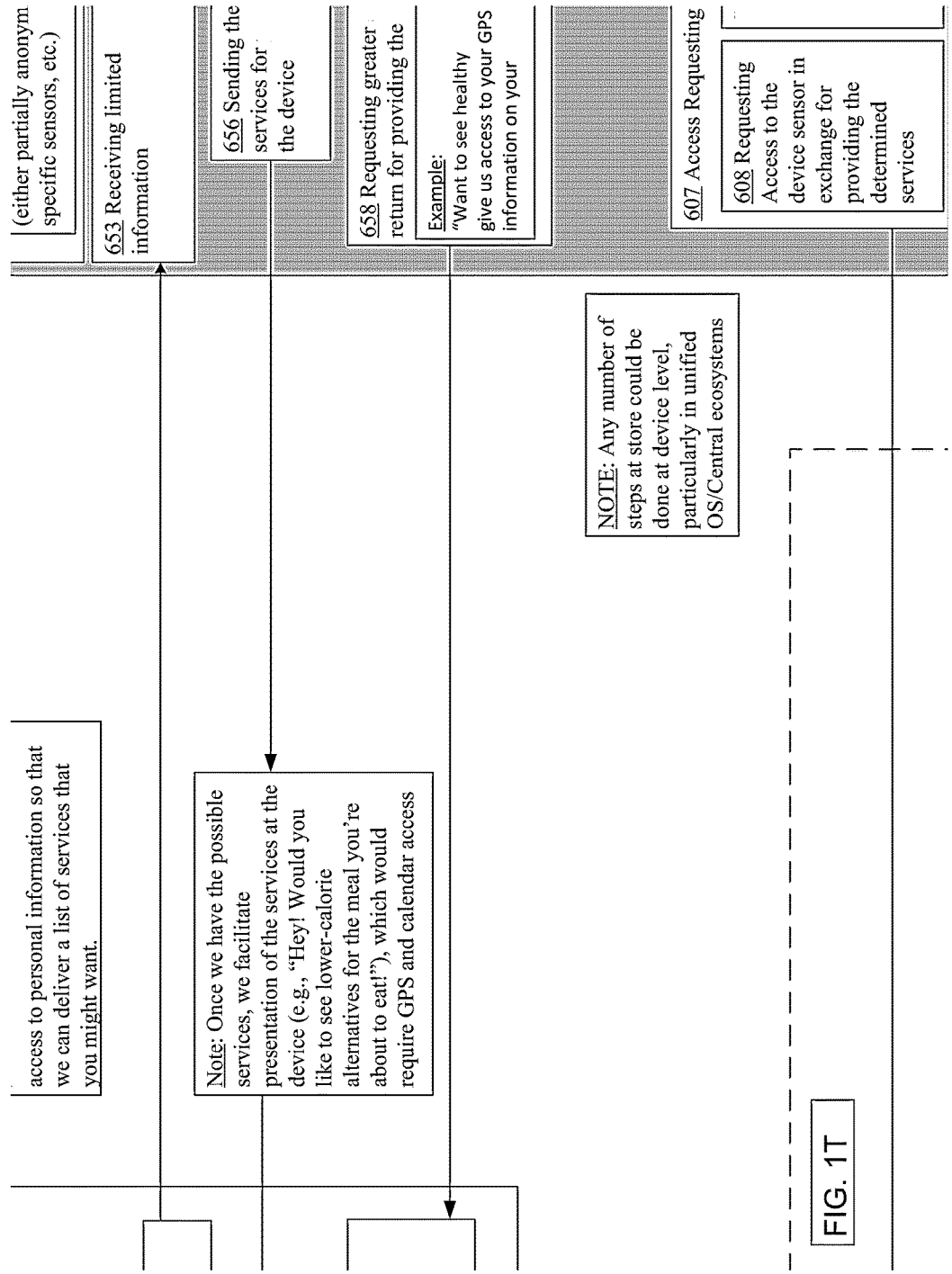
Figure 1U:
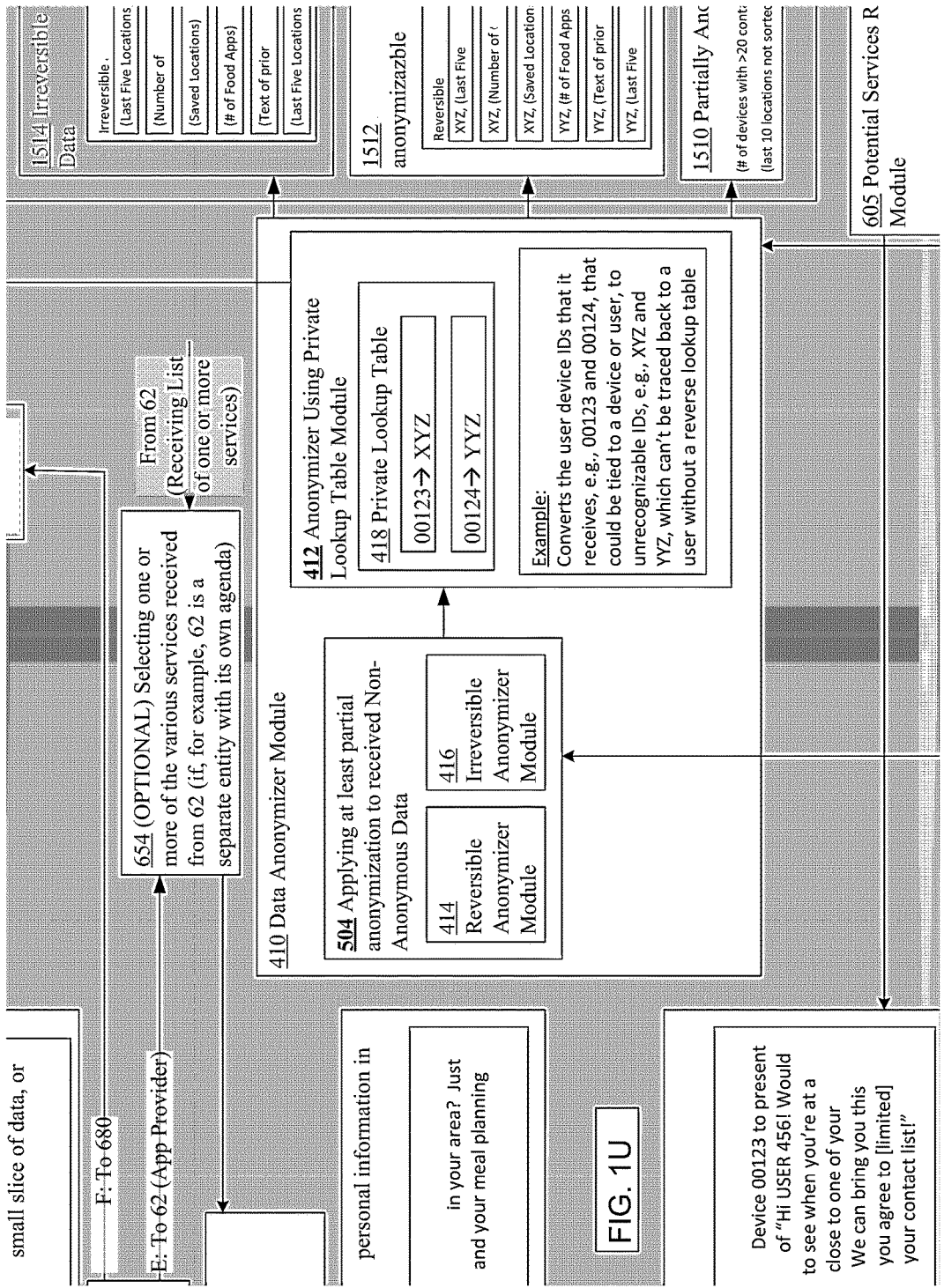
Figure 1V:
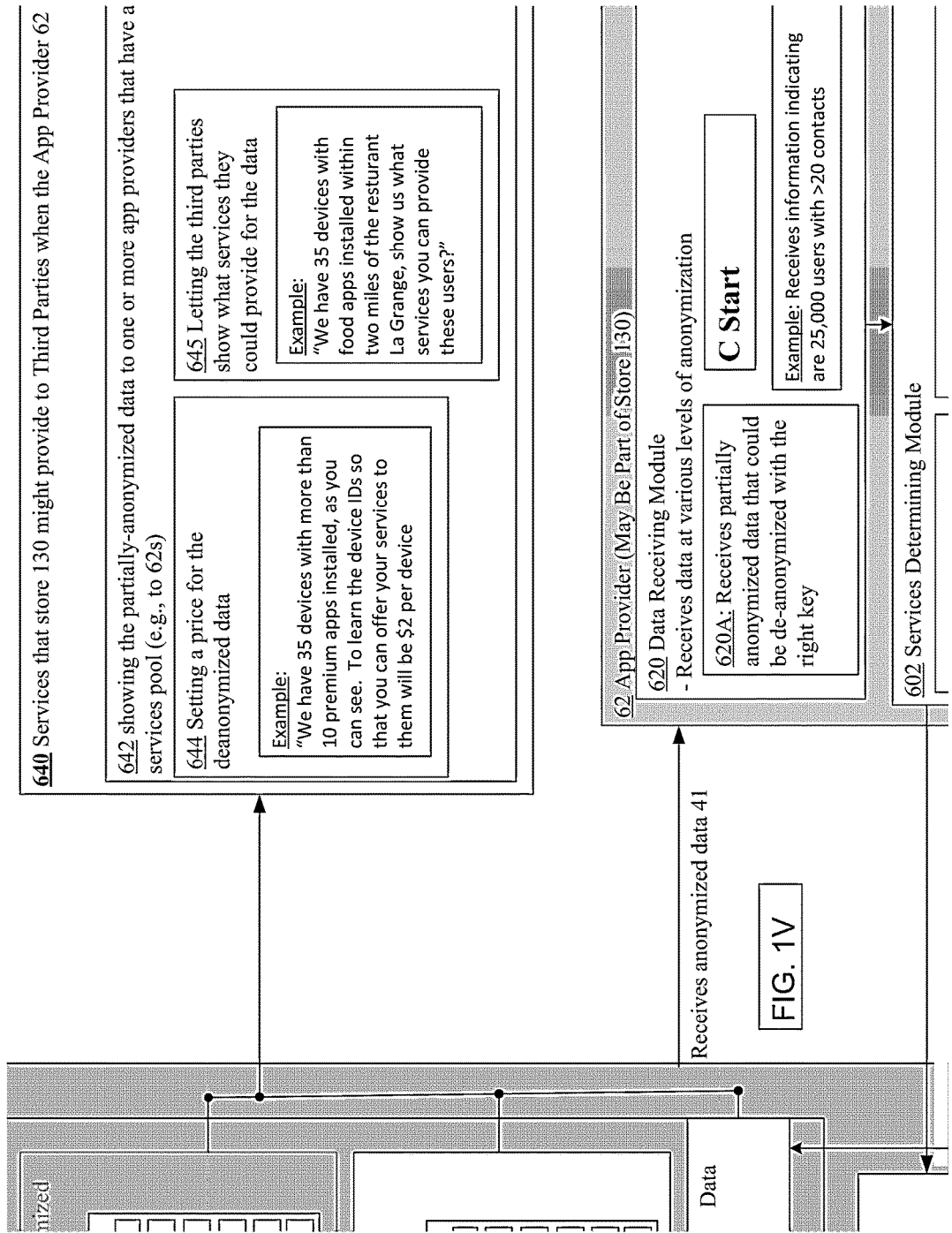
Figure 1Z:
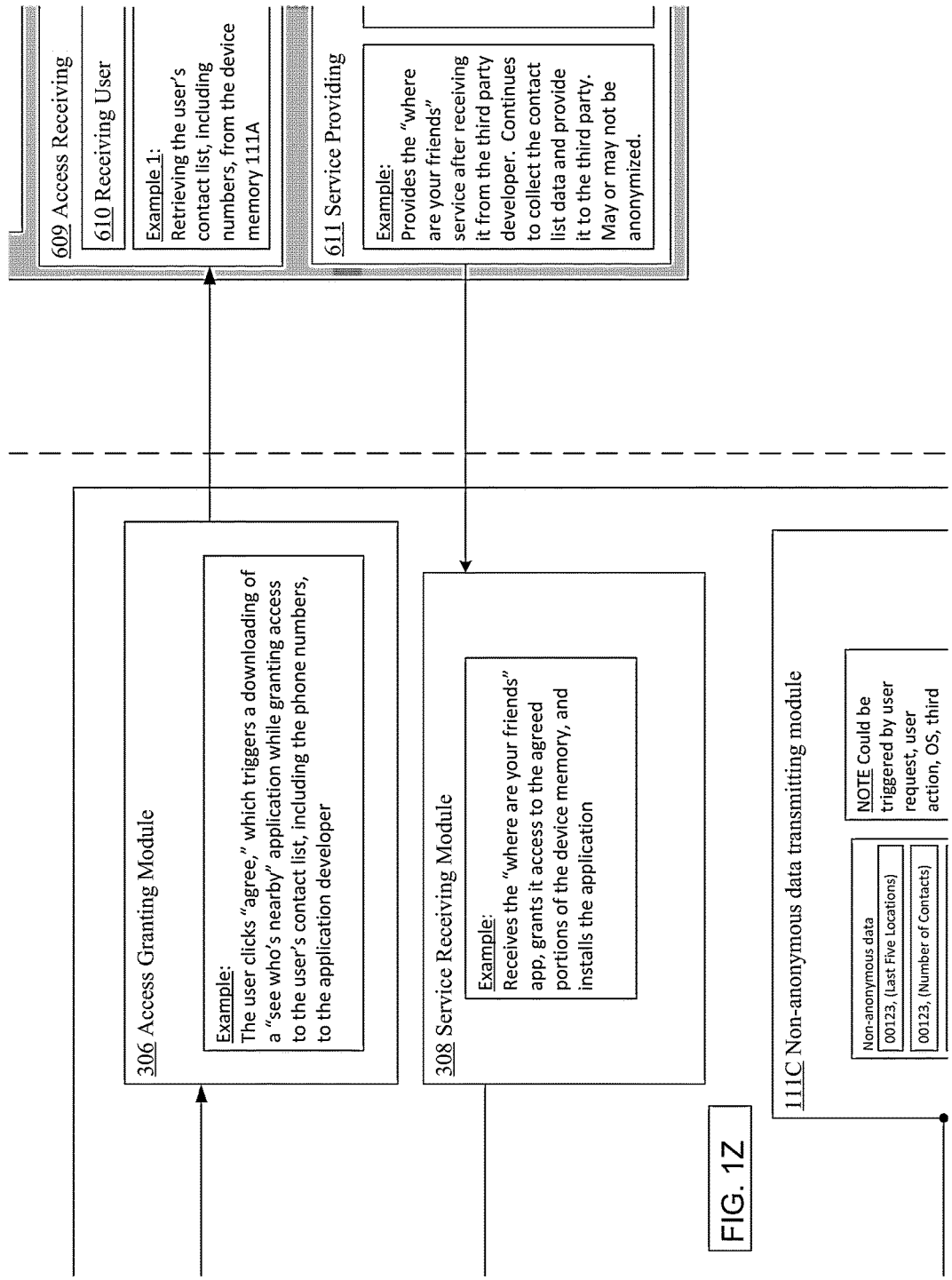
Figure 1A:
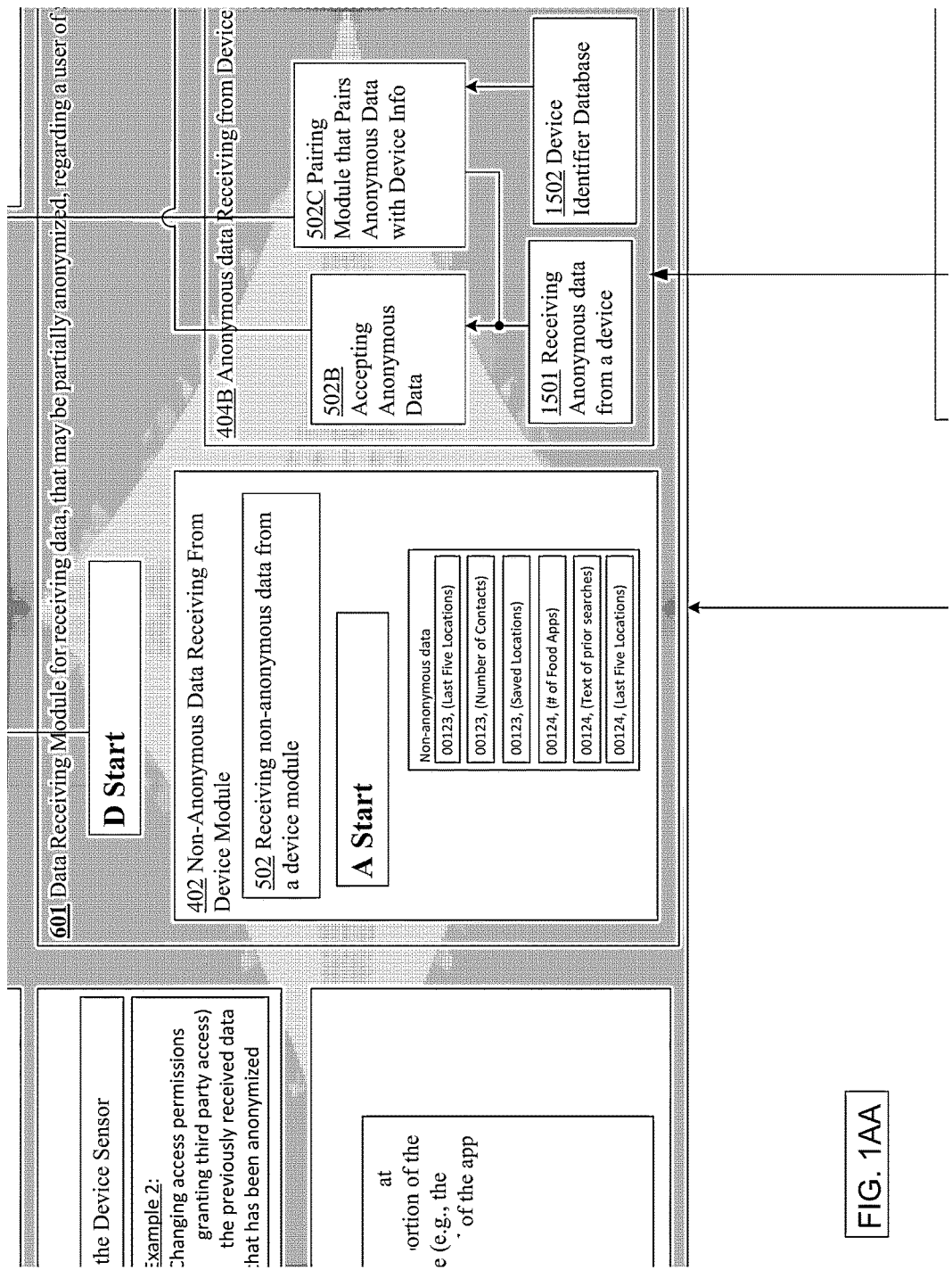
Figure 1A:
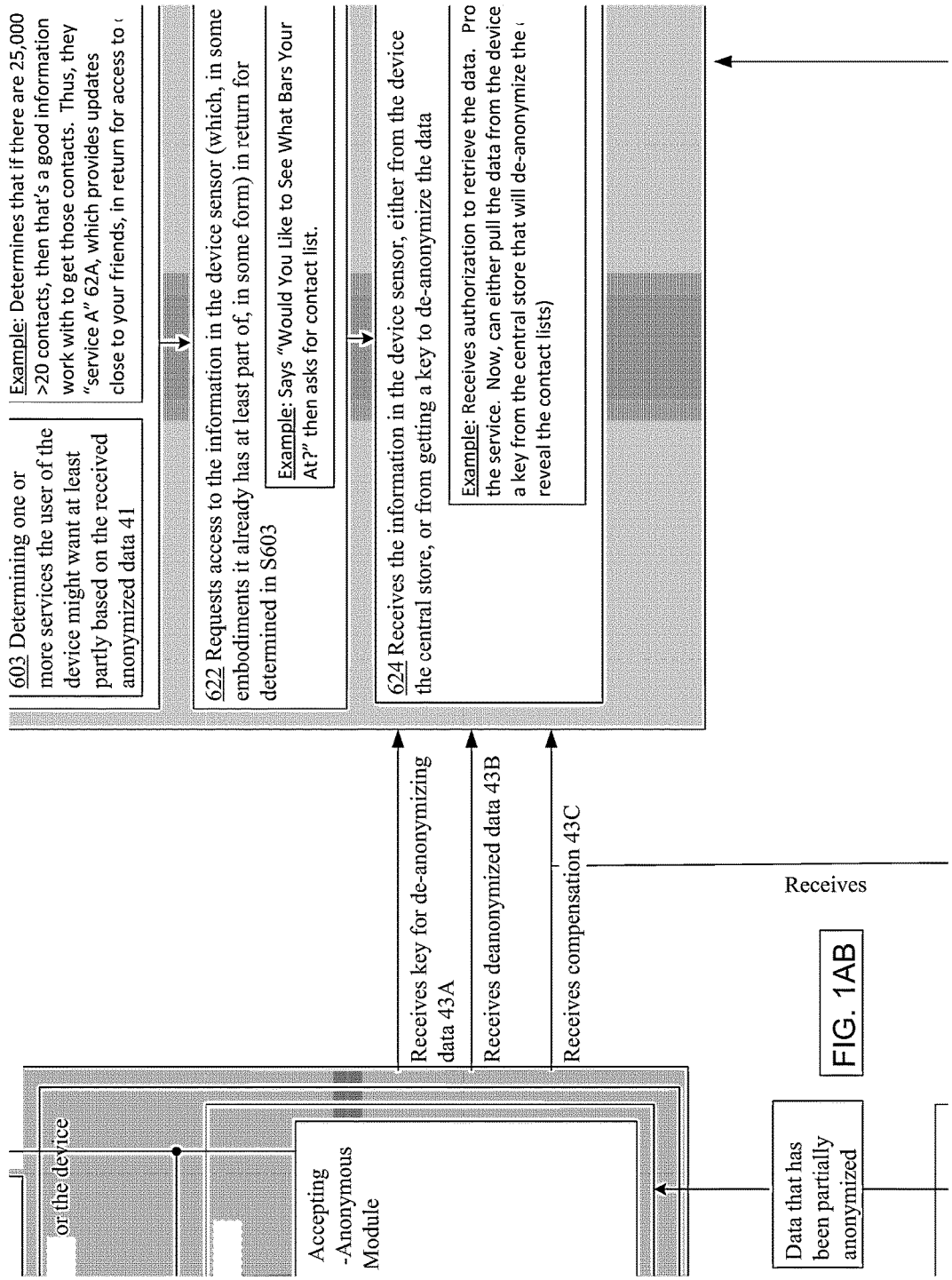
Figure 1A:
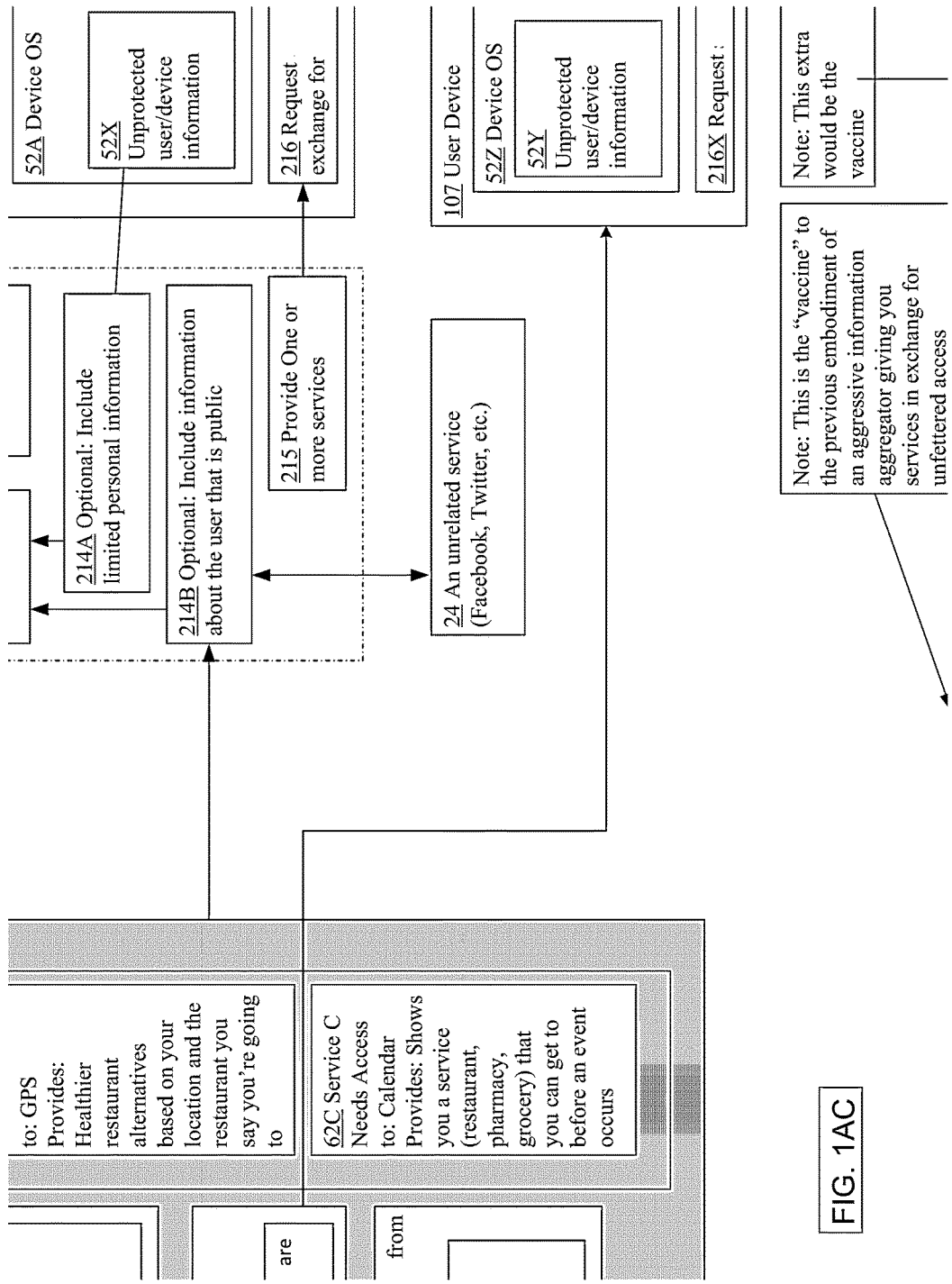
Figure 1A:
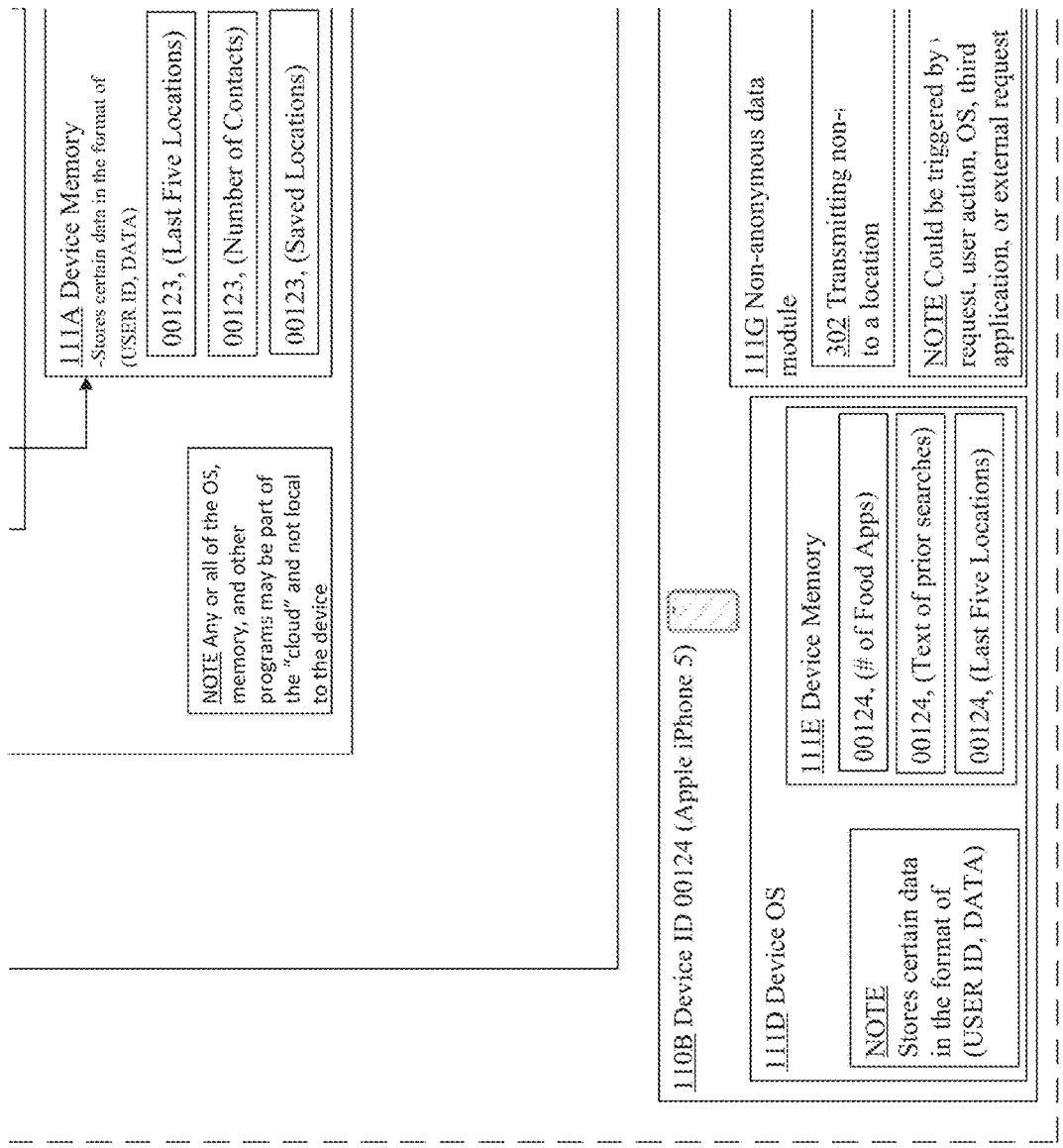
Figure 1A:
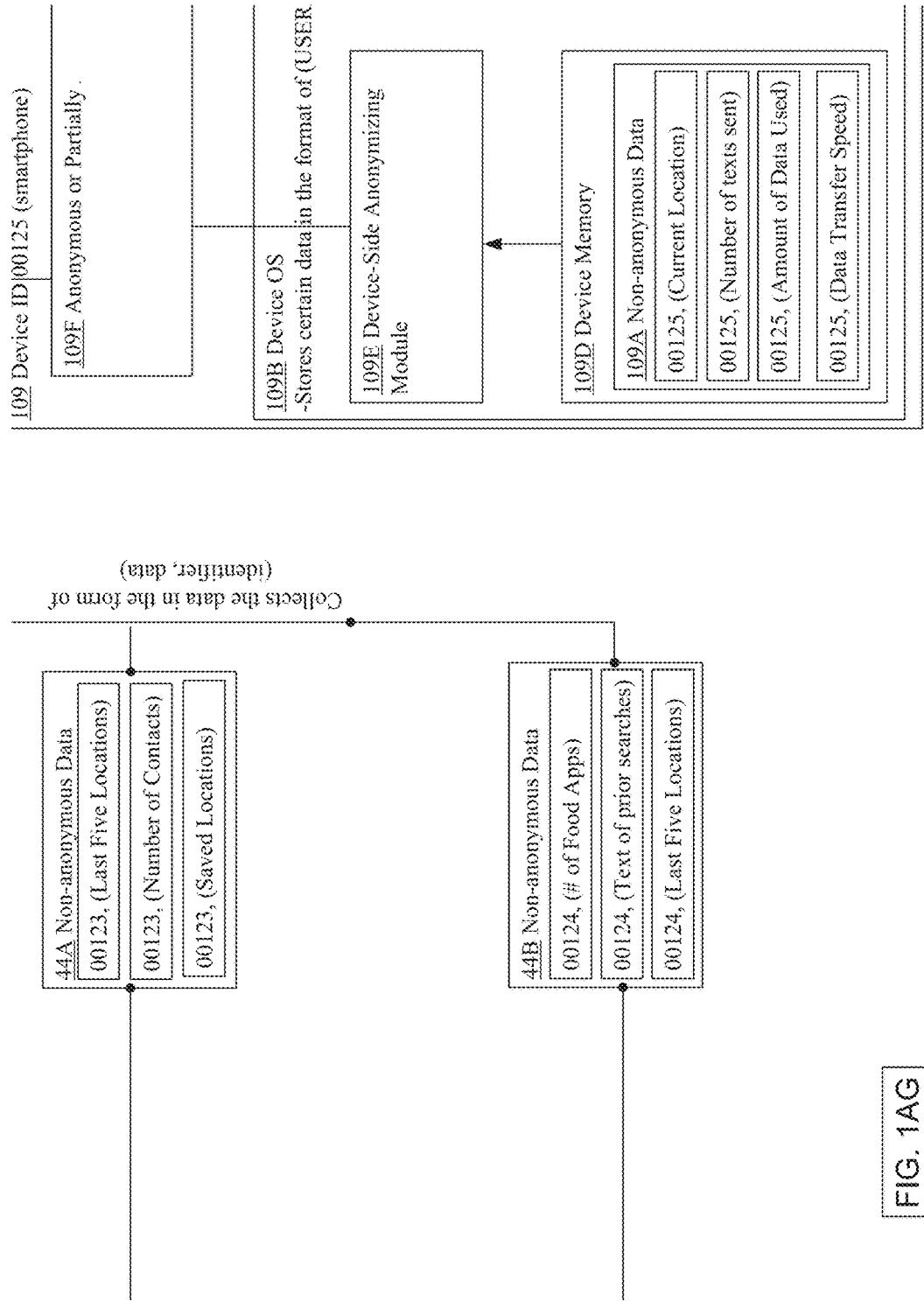
Figure 1A:
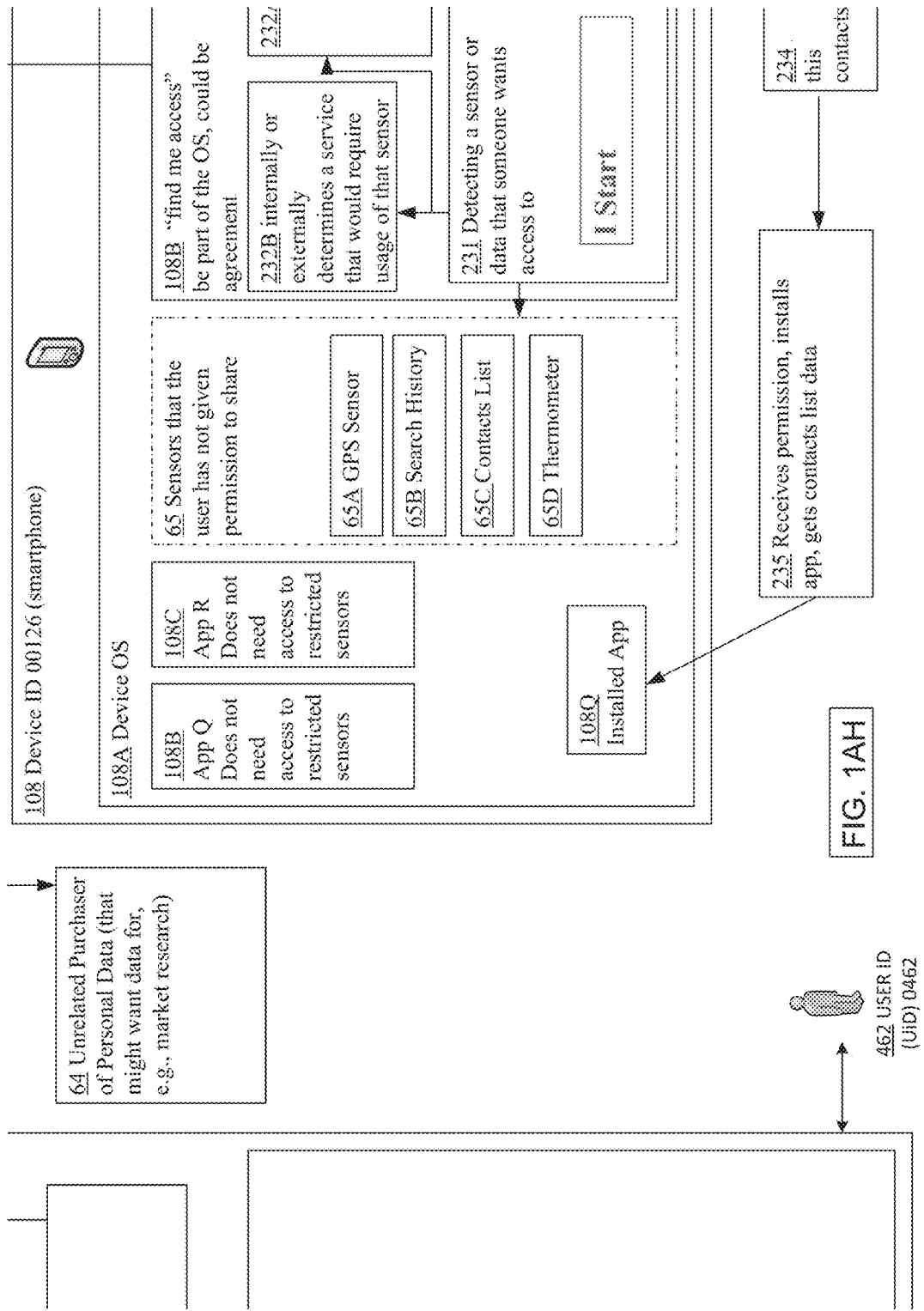

| FIG. 1A | FIG. 1B | FIG. 1C | FIG. 1D | FIG. 1E | FIG. 1F |
| FIG. 1G | FIG. 1H | FIG. 1I | FIG. 1J | FIG. 1K | FIG. 1L |
| FIG. 1M | FIG. 1N | FIG. 1O | FIG. 1P | FIG. 1Q | FIG. 1R |
| FIG. 1S | FIG. 1T | FIG. 1U | FIG. 1V | FIG. 1W | FIG. 1X |
| FIG. 1Y | FIG. 1Z | FIG. 1AA | FIG. 1AB | FIG. 1AC | FIG. 1AD |
| FIG. 1AE | FIG. 1AF | FIG. 1AG | FIG. 1AH | FIG. 1AI | FIG. 1AJ |

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

With reference now to the Figures and with reference now to FIG. 1, FIG. 1 shows a partially schematic diagram of an environment(s) and/or an implementation(s) of technologies described herein. It is noted that FIG. 1 is a high-level environment diagram. As such, some elements of the system of FIG. 1 are expressed through the function they carry out. In such circumstances, these elements should be considered to include any combination of one or more module, hardware, program, microprocessor configuration, state machine, firmware, field-programmable gate array ("FPGA"), application programming interface ("API"), function, class, data structure, dynamically loaded library ("DLL"), database (e.g., SQL database), and the like.

FIG. 1 depicts user 455, user 456, user 457, user 458, user 459, user 460, user 461, and user 462. In some embodiments, (e.g. starting from FIG. 1P, and proceeding counter-clockwise), user 455 may be associated with device 110A. Device 110A may have a device identification number (e.g., Device ID, or "DID") of 00123. In some embodiments, user 456 may be associated with device 110B. Device 110B may have a device identification number of 00124. In some embodiments, user 462 may be associated with device 109. Device 109 may have a device identification number of 00125. In some embodiments, user 457 may be associated with device 108. Device 108 may have a device identification number of 00126. In some embodiments, user 458 may be associated with device 106. Device 106 may have a device identification number of 00127. In some embodiments, user 459 may be associated with device 104. Device 104 may have a device identification number of 00129. In some embodiments, user 460 may be associated with device 122. Device 122 may have a device identification number of 00135. In some embodiments, user 461 may be associated with device 112. Device 112 may have a device identification number of 00141.

In some embodiments, one or more devices, e.g., devices 110A and 110B may be in communication with store 130. In some embodiments, store 130 may have a preexisting relationship with one or more of devices 110A and 110B. For example, an operator of store 130 may also produce operating system applications for device 110B. In other embodiments, store 130 does not have a preexisting relationship with devices 110A or 110B.

Store 130 may include, among other limitations, store side services selecting module 684, displaying services module 686, user selection and/or information authorization receiving module 688, communicating with devices for which no information is available module 650, requesting limited access to personal information 652, receiving limited personal information 653, sending the possible services for presentation on the device 656, requesting greater access to personal information in return for providing the services 658.

In some embodiments, store 130 may include, among other limitations, providing authorized information to service provider 670, in addition to providing user information for the service provider 163b, also keep information in memory for later use/sale/analysis 671, optional (if 140/130 not integrated) limited personal information transmitting module 682, received limited personal information (e.g., from 601, 653) 680, optional selecting one or more of the various services received from 62 (if, for example, 62 is a separate entity with its own agenda) 654, a memory 420, and a data anonymizer module 410, In some embodiments, data anonymizer module 410 may include applying at least partial anonymization to received non-anonymous data 504. In some embodiments, applying at least partial anonymization to received non-anonymous data 504 may include reversible anonymizer module 414 and irreversible anonymizer module 416. In some embodiments, data anonymizer module 410 may include anonymizer using private lookup table module 412, which, in some embodiments, may include private lookup table 418.

In some embodiments, memory 420 may include one or more of lookup table storage module 422, private lookup table module 418, irreversible anonymized data 1514, anonymous but de-anonymizable data 1512, and partially anonymized data 1510.

In some embodiments, store 130 may further include access requesting module 607, access receiving module 609, and service providing module 611. Access receiving module 609 may include receiving user access to the device sensor 610. Service providing module 611 may include providing at least a portion of the service 612.

In some embodiments, store 130 may further include Data Receiving Module for receiving data, that may be partially anonymized, regarding a user of the device or the device 601. In some embodiments, module 601 may include one or more of non-anonymous data receiving from device module 402 and anonymous data receiving from device module 404B. In some embodiments, module 402 may include receiving non-anonymous data from a device module 502. In some embodiments, module 404B may include receiving anonymous data from a device 1501, accepting anonymous data 502B, pairing module that pairs anonymous data with device info 502C, device identifier database 1502, and accepting quasi-anonymous data module 502D. In some embodiments, store 130 may further include potential services receiving module 605.

Referring again to FIG. 1, various embodiments may include one or more third party service providers, e.g., third party service provider 160A and third party service provider 160B. In some embodiments, third party service provider 160A may receive authorized information transmitted from module 670 of the data store 130. In some embodiments, third party service provider 160A may include receiving information to carry out service module 164A, services that can be provided determining module 163A, limited personal information receiving module 161A, and request to show what services can be provided with personal information request receiving module 162A. In some embodiments, module 163A may include sending the determined services back to the main store module 163X. In some embodiments, third party service provider 160B may include services that can be provided determining module 163B, limited personal information receiving module 161B, and request to show what services can be provided with personal information request receiving module 162B.

Referring again to FIG. 1, various embodiments may include a third party service provider 160C. In some embodiments, third party service provider 160C may receive authorized information transmitted from module 670 of the data store 130. In some embodiments, third party service provider 160C may include receiving information to carry out service module 164C, services that can be provided determining module 163C, services that can be provided transmitting module 166, request to show what services can be provided with personal information request receiving module 162C, request to see available information transmitting module 165, limited personal information availability browsing module 162, and limited personal information block selection module 168. In some embodiments, module 163C may include determining services based on various personal information blocks module 167.

Referring again to FIG. 1, various embodiments may include a telecom provider 105. Telecom provider 105 may include telecom-provided services module 806C, external-provided services module 806D, data rights receiving module 810, telecom services offering module 808, received data realization module 812, detecting module 802, and determining module 804. In some embodiments, telecom-provided services module 806C may include module 806B that uses services that the telecom can provide, e.g., increased speed in order to make the device work better. In some embodiments, external-provided services module 806D may include module 806A that receives services that use the information that the telecom wants, e.g., receiving services from the services that can be provided transmitting module 166 of third party service provider 160C, as previously discussed. In some embodiments, determining module 804 may include soliciting for or determining apps that provide access to the sensors that collected the data that the telecom wants 804A, or in some embodiments, determining module 804B may include determining a third party that wants the data and that might have designed an app to get the data 804B, which may communicate that to the request to show what services can be provided with personal information request receiving module 162C of third party service provider 160C. In some embodiments, module 808 may include offering the services to the user in exchange for rights to the data 808B. In some embodiments, data rights receiving module 810 may include receiving rights to view or store or save or sell or exchange the data 810B. In some embodiments, module 812 may include selling or exchanging the received data 812B. Telecom provider 105 may communicate with one or more different types of devices. An example of this is shown in FIG. 1, in which telecom provider 105 is providing a communication network for device 112, used by user 461.

Referring again to FIG. 1, in some embodiments, there may be a sandboxed data exchange module. In some embodiments, module 102 may provide a market for data by showing what data is available to third party developers, and may provide a venue for third party developers to request different types of data, or to gauge what data is available for them to design applications around. In some embodiments, module 102 may include selling data a and data b to application developer module 224, asking App2 and App3 for Data A and Data B in return for cash or a profit share in C module 203B, detecting that AppDev2 has Data A and AppDev3 has Data B, a database 222 that tracks which developers and/or applications have which data, a receiving request for Data A and Data B module 201, and finding devices that have already granted access to Data A and Data B to different applications 203A.

For example, sandboxed data exchange module 102 is referred to as "sandboxed" because the data is managed at varying levels of anonymity. Similarly to the data store 130 described above, in some embodiments, the data exchange module receives data to which some level of abstraction has been applied. For example, personally identifiable information may be stripped, so the data cannot be traced back to the user. In another example, uniquely identifiable information may be removed, so that the data cannot be traced back to any unique device, regardless of whether that device could then be identified in other contexts (e.g., a randomly generated identification compared to a device-specific identification like a MAC address). In other embodiments, the data is aggregated or combined and presented in larger segments, or representations, e.g., "greater than 30 devices have X," or "22% of the devices have a combination of Y, Z, and A installed on their device," "64% of the devices at location Q have application P running," "35% of the devices having 4G LTE communication capability do not have a video management application installed."

Sandboxed data exchange module 102 may communicate with application developers, for example AppDev2 22, which has developed "App2," which is an application for loading on a device (e.g., a smartphone, tablet, computer, television, smart appliance, motor vehicle, stereo, or the like). Sandboxed data exchange module 102 also may communicate with AppDev3 23, which has developed App3, which is similar to App2. Sandboxed data exchange module 102 may communicate with Application Developer 925, which is developing an application 927. Application developing module 927 may develop App1 920. App1 920 may need Data A (e.g., data of type A, e.g., location data) and Data B (e.g., data of type B, e.g., contact list access), in order to provide service C (e.g., notification that someone's friends are close to their location). Thus, application developer 925, at some point in the developing an application stage 927, may use query generator 928 to generate a query regarding availability of Data A and Data B 929. Sandboxed Data Exchange module 102 may determine one or more pieces of information regarding Data A and Data B, either related to applications that already use one or more of Data A and Data B, or user devices that already have Data A and Data B present on them. For example, Sandboxed Data Exchange Module 102 may communicate with user device 51 to determine what data is present on user device 51. User device 51 may have a kernel and/or operating system 11, and may have App2, App3, and other apps (represented by AppN 55), that have access to Data A, Data B, and Data N. Thus, the sandboxed data exchange module 102 may have information regarding devices that have Data A and Data B, and thus may be in the market for service C, or that AppDev2 and AppDev3 already have access to Data A and Data B on device 51, and that the app developer 925 could pay for access to that data, either up-front or in a profit-sharing structure.

Referring again to FIG. 1, in some embodiments, a data store 114 may include a device capability retrieving information module 252, a device activity and capability monitoring module 114A, an activities presenting module 114B, and an access requesting module 114C. In some embodiments, device capability retrieving information module 252 may retrieve information about a device without actually communicating with the device. For example, module 252 may communicate with device specific-information providing module 146 that may provide information about a device. The module 146 may include one or more of public information 146A and non-public information 146B.

In some embodiments, module 114A may include monitoring user activities module 251. Module 251 may passively monitor, without gaining access to private or protected personal information, activities of device 112. Such monitoring may include monitoring public social media, e.g., tracking a user's actions through public postings to Facebook, Twitter, Four Square, and the like. In some embodiments, activities presenting module 114B may present services available to the user at a relevant time 253. That relevant time may be determined, in part, by monitoring user activities 251. The information from module 251 may also be retrieved or specifically transmitted to module 251 in a partially or fully anonymized format. In some embodiments, access requesting module 114C may request access to particular personal information in order to complete the service (e.g., requesting access to particular personal information of device 112.

Referring again to FIG. 1, in some embodiments, a data store 140 may be included. Data store 140 may be separate from store 130, or in some embodiments, data store 140 may be part of store 130. In other embodiments, store 130 and data store 140 may be under the control of the same entity, or under control of entities that are working together in a partnership. In some embodiments, data store 140 may include one or more modules or other implementations of limited access to secured information on a device 650D, transmitting the limited personal information to one or more entities 141D, request to service providers module 141C, service provider services response receiving module 141E, and data-store side services selecting module 141F. Specifically, the data store 140 may communicate with third party developers, e.g., third party developers 160A and 160B, as previously described. In some embodiments, data store 140 may receive possible services from the third party developers. In some embodiments, some selection or filtering of services may take place at data store 140, particularly if data store 140 and store 130 are not controlled by the same entity.

In some embodiments, data store 140 may generate a "store" showing what personal information is available from devices to developers. This store, e.g., limited personal information displaying to service providers module 141B may provide various options for third parties to view what type of data is available, as shown in the examples in 141B. Some of those examples of data may be free to view, others may have a profit-sharing arrangement, and still others might have an upfront cost.

In some embodiments, data store 140 may include limited personal information receiving module 141A and generating module 141I that generates blocks of available limited personal information. These modules may receive data from devices or from data store 130. Data store 140 also may include a request to display available information receiving module 141G, transmitting or otherwise facilitating the available personal information blocks module 141H, selection of one or more personal information blocks receiving module 141J, and selection of one or more personal information blocks receiving module 141K, which may communicate with one or more telecom providers 105 as previously described. Modules 141G, 141H and 141J may communicate with third party developers to facilitate display and selection of services from the store generated by 141B.

As shown in FIG. 1, some embodiments may include a device pool or data store back end 1200. Data store back end 1200 may be integral or separate from one or more of store 130 and data store 140. In some embodiments, data store back end 1200 may include responding to the received query module 854, determining how many devices in device pool are collecting particular type of data 850, monitoring one or more devices in the device pool 852, and receiving query from third party regarding how many devices are collecting particular type of data 851. In some embodiments, responding to the received query module 854 may include including cost estimate module 854A. In some embodiments, data store back end 1200 may monitor one or more devices and types of devices, e.g., device pool 2*. Device pool 2* may include one or more of tower computer 2A, desktop computer 2B, tablet device 2C, home entertainment device 2D, limited smartphone 2E, personal digital assistant 2F, motor vehicle control system 2G, laptop computer 2H, or any other type of device that stores and receives data.

As shown in FIG. 1, some embodiments may include a device, e.g., device 112. Device 112 may have a device operating system 112A. In some embodiments, device operating system 112A may include hardware, program, firmware, APIs, or any combination of the above. Device operating system 112A may display potential new services 73. Device operating system 112A may include a displaying services module 756, selecting one or more services module 757 (e.g., which, in some embodiments, may use user input 757A from user 458), and transmitting module 758 that transmits selection of services and authorization for access to more information and/or sensors. Device 112 also may include request for limited user information receiving module 750 that receives a request 751 from the data store 130, said request including limited access to personal information. Device 112 also may include limited user information transmitting module 752, and access for new services request receiving module 754.

Referring to FIG. 1, in some embodiments, a prospective app developer device pool 901 may include receiving a response to a query 904, generating one or more queries regarding specific data 902, and generating an idea for an application that needs a certain amount or kind of data 903. In this example, generating module 902 generates a query regarding whether specific data is available, and receives a response from the back end 1200 regarding whether that data is available, how much of it is available, and/or how much the data costs 904A.

Referring to FIG. 1, in some embodiments, when an application provider 62 is separate from store 130, then services module 640 may interface between the application providers 62 (which will be discussed in more detail herein) and the previously-described data store 130. For example, services module 640 may include showing module 642 that shows the partially-anonymized data to one or more app providers that have a services pool (e.g., application provider 62) and partially anonymized data providing module 646, which may provide (e.g., transmit) partially anonymized data to a third party application provider. In some embodiments, module 642 may include price setting module 644 and seeing services module 645 that lest the third parties show what services they could provide for the data.

Referring again to FIG. 1, in some embodiments, there is an app store 142 that interfaces with user devices, e.g., device 122. In some embodiments, device 122 may include a device operating system 122A, existing services 122B, displaying potential services 73 (e.g., which may include service selection module 753B, and device activity module 756 (e.g., which may include limited user information transmitting module 752B. In some embodiments, app store 142 may include information gathering module 242, which may gather information about the device from the available data, which may be limited, app store matrix generating module 73, which may generate the app store 72 using generating module 245. Module 247 may receive input from module 244, which weighs the displaying of the apps by preference of which application gives access to the most useful data. App store 142 also may include device activity and capability monitoring module 243 that monitors information about the device 122.

In some embodiments, app store 142 generates an "application store" that devices can browse. In such an app store, applications are shown, and concurrently shown are the access that is required. For example, as shown in app store interface 72, if there is a navigation app, then access to the GPS sensor is required. If there is a cycling app, then access to the accelerometer is required, and if there is a LinkedIn app, then access to the contact list is required.

Referring again to FIG. 1, in some embodiments, there may be non-anonymization devices 110, e.g., device 110A and device 110B. In some embodiments, these devices do not handle data anonymization, but merely transmit data to the data store 130, and the devices may have an agreement with the store 130 to anonymize the data, or the store 130 may provide anonymization without explicit authorization from the devices. Device 110A, for example, may include a request for access receiving module 304. The request for access receiving module 304 may include receiving a list of services and/or an access request 305, or receiving a specific service or access request 307. The device 110A also may include an access granting module 306 and a service receiving module 308, which communicate with store 130 to grant access to information or sensors, and receive the service, respectively. Device 110A also may include, in some embodiments, a device OS 111B including a service managing module 310, a device memory 111A, a storing data related to service module 316, receiving service 312 and executing service 314. Device OS 11B may communicate with, or include as part of itself, a non-anonymous data transmitting module 111C. Module 111C may transmit non-anonymous data to a location 302.

Similarly, in some embodiments, a device 110B may include a device OS 111D, a device memory 111E, a non-anonymous data transmitting module 111G that transmits non-anonymous data 302 to a location. As shown in FIG. 1, device 110B may similarly transmit data that has not been anonymized, e.g., that can be used to identify the device, to the store 130.

Referring again to FIG. 1, in some embodiments, a user device 104 may include a device OS 52A, and an access requesting module 216. Device OS 52A may include unprotected user and/or device information 52X, and sensors that the user or the device OS can restrict access to 52B, which may include one or more of GPS sensor 52C, accelerometer 52D, search history 52E, and contacts list 52F, by way of example. The device may communicate with app provider 62, which will be discussed in more detail herein. Similarly, user device 107 also may communicate with app provider 62. In some embodiments, user device 107 may include a device OS 52Z, unprotected device information 52Y, sensors that the user or operating system can restrict access to 52P, and access requesting module 216X.

Referring again to FIG. 1, in some embodiments, app provider 62 may be part of store 130, or may be a separate entity from store 130. App provider 62 may include a data receiving module that receives the data from the devices directly, or after it has been anonymized from the store 130. App provider 62 may include services determining module 602, access requesting module 622, information receiving module 624, and services pool 620. Services pool 620 may include service 62A, which needs access to a contact list, and provides updates when the device is close to other devices on the contact list, service 62B, which needs access to GPS sensors, and provides healthy restaurant alternatives based on the device location, and service 62C, which needs access to the calendar on the device and provides a service of showing the user places that the user can get into and out of in time for the user to be on time for his or her next event in the calendar.

Referring again to FIG. 1, in some embodiments, there may be a device 109 that handles data anonymization on the device side. Specifically, device 109 may include a device OS 109B that includes a device memory 109D and a device-side anonymizing module 109E that takes the data from device memory 109D and anoynymizes it. The data is then transmitted to module 109F, which transmits the anonymous or partially anonymous data to store 130. In some embodiments, anonymization is provided at both the device side and at the store side, and in some embodiments, a portion of the anonymization is carried out at both the store side and the device side, and the combination results in anonymous data.

Referring again to FIG. 1, in some embodiments, there may be a device 108 that has an access finding module 108B, which may be installed on the device, either as part of the operating system, or installed by the user or a third party, or hard-wired into the device. Access finding module 108B may include usage and service determining module 232B, sending out module 232A, service receiving module 233, and sensor detecting module 231. Sensor detecting module 231 may trigger the process by detecting a sensor of the sensors 65 on the device that the user has not given permission to share with third parties, but that a third party might want access to. The third party in this example may be a device, operating system, or network manager or manufacturer. The device receives an application that will require access to the server, and presents it to the user at 234. After permission is received at 235, it installs the application 108Q and gets access to the sensors 65 for which access was desired.

In some embodiments, a device 106 may include a device OS that includes a granting of access to a sensor for a service 221. The sensor that the user gave permission to in return for the service is contact list 64A, which was granted in module 64. A personal information defender 222 is also present on the device, and detects that after the service is rendered, access to the device's contact list has not expired. The personal information defender 222 then informs the user at module 223 and requests if the user really wants to continue permitting access to the sensor or information. The user thus has the option to discontinue access to a particular information or sensor after the service has been rendered.

In another embodiment, another module is present on the device that detects the discontinuing of permission 224. In this embodiment, module 224 would then trigger a search for a new service that would again require access to the sensor or information wanted by the third party, and the process of requesting access would be repeated.

Thus, in the embodiments described above, a marketplace is created for access to a user's data, and services that might be provided in exchange for that access. In that marketplace, users, developers, third party providers, telecoms, and other entities may exchange services and access in a marketplace where identity and access is protected, but information about availability is facilitated.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

In some embodiments, a method includes receiving at least partially anonymized data regarding [a user of] the device [601], determine one or more services [the user of] the device might want at least partly based on the received partially anonymized data [603], requesting access to the device sensor of the device in exchange for providing the one or more determined services [608], receiving access to the device sensor, [610] and providing at least a portion of the one or more services [could be as simple as downloading an app] [612].

In some embodiments, a method includes transmitting at least partially anonymized data regarding [a user of] the device [302], receiving a list of one or more services [the user of] that could be provided at least partly based on the data not previously transmitted but configured to be collected [304/305], receiving a request for access to the data in return for providing one or more of the services [304/307], providing access to the data [306], and receiving at least a portion of the one or more services [could be as simple as receiving an app that can run the services] [308].

In some embodiments, a method includes receiving encrypted anonymized data that could be un-anonymized if the correct key was received [620A], reading limited portions of the encrypted data to determine one or more services the user might want [603], requesting access to the device sensor of a user in exchange for providing services [622], and receiving the "unlock" key to unlock the rest of the data in return for providing the one or more services [624].

In some embodiments, a method includes collecting data including at least one set of a user ID and at least one piece of information regarding the user [for example, a set of (user 34024, GPS log)] [601], for each of the data collected, anonymizing the data by replacing the user ID with generic information [or deleting the information all together] [the generic information could be like (male, GPS log) male 02654], or (male age 34, GPS log), taken from information (user 34204, GPS log)] [504], creating a nonrecoverable key table [e.g., using encryption, private/public key, etc.] configured to convert the generic information back into personally-identifyable data and [412] making the anonymized data available to third parties to determine whether the third party has one or more services to provide to the user, [either individually or collectively] [640/644] OR transmitting the anonymized data to a third party who may be interested in providing services to the device [640/646].

In some embodiments, a method includes requesting limited access to personal information [e.g. location data] in return for figuring out what services are wanted [650/652], determining what services might be wanted [based on the limited access to personal information] [654/65], facilitating presentation of the services at a device [656/73], and requesting greater access to personal information in return for providing the services [658].

In some embodiments, a method includes having limited access to personal information (including location data) [650D/652], transmitting the limited personal information to one or more entities configured to provide one or more services [141D], requesting that one or more entities show what services they could provide in return for access to the data [perhaps inherently "showing third parties the limited personal information"] [141C], selecting one or more of the third party services based on one or more factors [141F], showing the third party services to the user and letting him select one (possibly with some filtering), but the selection gives A the right to get the data and give it to the third party, [684], and giving the data to the third party (and possibly keeping it for themselves) [670].

In some embodiments, a method includes receiving a request to display available personal information blocks [141G], facilitating presentation of one or more available personal information blocks [141B], receiving a selection of the one or more available personal information blocks [141-J], and giving the data to the third party (and possibly keeping it for themselves).

In some embodiments, a method includes monitoring a set of activities carried out by a user of a device [This assumes we already have the limited access baked in] [251], retrieving information about capabilities of the device [252], presenting, at a relevant time, the device with one or more activities that the device could do at least partly based on the activities and partly based on the capabilities of the device, wherein said one or more activities could be carried out with access to one or more pieces of information and [253], and requesting access to the one or more pieces of information in exchange for carrying out the one or more activities. [254]

In some embodiments, a method includes detecting one or more device sensors to which access is restricted (e.g., doesn't have to be denied, could be just restricted) [231], determining a service that would require usage of the device sensor (this could be based on just about anything) [232B], presenting a request for access to the device sensor to the user [234] and receiving permission to access the device sensor to which access is restricted [235/108Q].

In some embodiments, a method includes detecting that access is given to one or more applications to one or more device sensors to provide one or more services [221], detecting that the one or more services are completed and the device still has access to the one or more device sensors [222], and informing the user that the one or more services are completed and asking if the user wants to continue granting access, knowing that the service will be discontinued if the access is cut off [223]. Optionally, if the user says no, presenting more services that the user might want [224].

In some embodiments, a method includes detecting, based on data transmitted over a network, one or more services a user might want [802], determining if there are any third parties that want access to the data transmitted over the network [804A], suggesting services in exchange for getting to use that information (this might be as simple as increasing data speed) [808] and, receiving permission to use the information in exchange for services. Optionally, selling the received information [812].

In some embodiments, a method includes monitoring a set of activities carried out by a user of a device [242], monitoring current conditions of a device, and [243] facilitating presentation on the device of one or more activities that the device could do, at least partly based on the current conditions and partly based on the capabilities of the device, in a matrix with access that has to be granted in order to have the one or more activities performed [73/245].

In some embodiments, a method includes monitoring one or more devices to determine one or more pieces of information collected (e.g., temperature data) [852], determining how many devices are collecting a particular type of data [850], receiving a query regarding one or more specific types of data (how many devices are moving at 6 mph for at least 30 minutes on a day over 80 degrees) and [851] presenting/transmitting a result of the received query [854].

In some embodiments, a method includes receiving an indication that an application needs data A and data B to provide service C [201], receiving an indication that application X has rights to data A and application Y has rights to data B [221/222/203B], and asking application X for data A and application Y for data B with the application in exchange for a share of C's profits [224].

In some embodiments, a method includes receiving an indication that an application needs data A and data B to provide service C [201], determining how many devices already have apps with access to data A and access to data B [203A], and querying those devices that, since they've already granted permission for data A and data B to other apps, would they be interested in getting service C and/or giving service C access to data A and data B [204A].

In an embodiment, as shown in FIG. 1, data from a device, e.g., device 110A is acquired, e.g., non anonymous data 44A is acquired at store 130. Non-anonymous data 44A is related to a device memory 111A of device 110A. After receiving non-anonymous data 44A from device 110, a data anonymizer 410 may apply one or more operations, e.g., anonymization operations, to non-anonymous data 44A. For example, one or more encryption algorithms or data obscuring techinques may be applied. In an embodiment of the invention, for example, data nonymizer 41 may include an anonymizer using private lookup table module 412. Anonymizer using private lookup table module 412 may apply private lookup table 418 to non-anonymous data 44A to arrive at anonymous data 1512. Anonymous data 1512 may be de-anonymizable.

In an embodiment, anonymous data 1512 may be transmitted to an application provider 62. Application provider 62 may include a services determining module 602 that determines one or more services the user of the device might want, at least partly based on the received anonymized data 1512. For example, based on the anonymized data 1512, services determining module 602 may determine that if there are 25,000 users with twenty or more contacts, then there is a sufficient information base to work with to get copies of those contacts. Then, application provider 62 may retrieve service 62A from a services pool 620. Service 62A is a service that is a "where are your friends" application that causes a notification to be generated when a user is within a particular proximity to a person on that user's contact list. Service 62A may already be present in services pool 620, or may be created by application provider 62.

In an embodiment, application provider 62 may transmit the determined service 62A to the store 130. This transmission may be external, and may involve one or more communication networks, if application provider 62 and store 130 are separate entities. If application provider 62 and store 130 are not separate entities, this transmission may be internal, e.g., via a bus, or via an exchange of data between two applications with different rights to various data and/or services.

In an embodiment, after the store 130 receives determined service 62A, access requesting module 607 of store 130 presents service 62A to the device, and requests greater access to personal information in return for providing the services. For example, access requesting module 607 instructs device 00123 to present a message of "Hi USER 456! Would you like to see when you're at a location close to one of your friends? We can bring you this service if you agree to let us access your contact list." This request is received by the device, e.g., device 110A, at request for access receiving module 304. Module 304 presents the request, and interfaces with user 456. If the access is granted, then access granting module 306 of device 110A transmits the grant of access to an access receiving module 609 of store 130. At that point, access receiving module 609 retrieves the user's contact list, and service providing module 611 provides the service 62A.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method configured to be implemented using a server that operatively communicates with at least one service provider and one or more user devices via one or more networks, the method comprising:

receiving at the server personal data associated with a user from at least one user device;

processing at the server the received personal data into anonymous data, the anonymous data including a non-identifying portion of the personal data and an encrypted portion that, if de-encrypted, would enable identification of the user associated with the personal data;

transmitting the anonymous data to at least one service provider;

receiving an indication from the at least one service provider of one or more services available to be offered to the user associated with the anonymous data if the at least one service provider were enabled to access the encrypted portion of the anonymous data;

transmitting to the at least one user device associated with the user an offer to provide the one or more services in exchange for access to the encrypted portion of the anonymous;

receiving an indication from the at least one user device that the user has accepted the offer to allow access to the encrypted portion of the anonymous data in exchange for the one or more services; and providing a key to the at least one service provider to enable de-encryption of the encrypted portion of the anonymous data in exchange for the providing of the one or more services.

2. The computationally-implemented method of claim 1, wherein said personal data is required to carry out the one or more services.

3. The computationally-implemented method of claim 1, wherein de-encryption of the encrypted portion of the anonymous data is required to carry out the one or more services.

4. The computationally-implemented method of claim 1, wherein receiving an indication from the at least one service provider of one or more services available to be offered to the user associated with the anonymous data comprises receiving a plurality of indications from a plurality of service providers of one or more services available to be offered to the user associated with the anonymous data.

5. The computationally-implemented method of claim 1, wherein receiving an indication from the at least one service provider of one or more services available to be offered to the user associated with the anonymous data comprises receiving a plurality of indications from a plurality of service providers of one or more services available to be offered to the user associated with the anonymous data;

and wherein transmitting to the at least one user device associated with the user an offer to provide the one or more services in exchange for access to the encrypted portion of the anonymous data comprises:

analyzing the received personal data to determine one or services that may be wanted by the user associated with the personal data; and selecting from the plurality of indications of one or more services available at least one service to be offered to the user.

6. A system, comprising:

circuitry for receiving personal data associated with a user from at least one user device;

circuitry for processing the received personal data into anonymous data, the anonymous data including a non-identifying portion of the personal data and an encrypted portion that, if de-encrypted, would enable identification of the user associated with the personal data;

circuitry for transmitting the anonymous data to at least one service provider;

circuitry for receiving an indication from the at least one service provider of one or more services available to be offered to the user associated with the anonymous data if the at least one service provider were enabled to access the encrypted portion of the anonymous data;

circuitry for transmitting to the at least one user device associated with the user an offer to provide the one or more services in exchange for access to the encrypted portion of the anonymous data;

circuitry for receiving an indication from the at least one user device that the user has accepted the offer to allow access to the encrypted portion of the anonymous data in exchange for the one or more services; and circuitry for providing a key to the at least one service provider to enable de-encryption of the encrypted portion of the anonymous data in exchange for the providing of the one or more services.

7. The system of claim 6, wherein de-encryption of the encrypted portion of the anonymous data is required to carry out the one or more services.

8. The system of claim 6, wherein the circuitry for receiving an indication from the at least one service provider of one or more services available to be offered to the user associated with the anonymous data comprises circuitry for receiving a plurality of indications from a plurality of service providers of one or more services available to be offered to the user associated with the anonymous data.

9. The system of claim 6, wherein the circuitry for receiving an indication from the at least one service provider of one or more services available to be offered to the user associated with the anonymous data comprises circuitry for receiving a plurality of indications from a plurality of service providers of one or more services available to be offered to the user associated with the anonymous data;

and wherein the circuitry for transmitting to the at least one user device associated with the user an offer to provide the one or more services in exchange for access to the encrypted portion of the anonymous data comprises:

circuitry for analyzing the received personal data to determine one or services that may be wanted by the user associated with the personal data; and circuitry for selecting from the plurality of indications of one or more services available at least one service to be offered to the user.

10. The system of claim 6, wherein circuitry for receiving personal data associated with a user from at least one user device comprises:

circuitry for receiving personal data associated with a user from at least one user device, the personal data including at least positioning system data;

and wherein circuitry for transmitting to the at least one user device associated with the user an offer to provide the one or more services in exchange for access to the encrypted portion of the anonymous data comprises:

circuitry for transmitting to the at least one user device associated with the user an offer to provide the one or more services using the positioning system data in exchange for access to the encrypted portion of the anonymous data.

11. The system of claim 6, wherein circuitry for receiving personal data associated with a user from at least one user device comprises:

circuitry for receiving personal data associated with a user from at least one user device, the personal data including at least contact list data;

and wherein circuitry for transmitting to the at least one user device associated with the user an offer to provide the one or more services in exchange for access to the encrypted portion of the anonymous data comprises:

circuitry for transmitting to the at least one user device associated with the user an offer to provide the one or more services using the contact list data in exchange for access to the encrypted portion of the anonymous data.

12. The system of claim 6, wherein circuitry for receiving personal data associated with a user from at least one user device comprises:
   circuitry for receiving personal data associated with a user from at least one user device, the personal data including at least accelerometer data;
   and wherein circuitry for transmitting to the at least one user device associated with the user an offer to provide the one or more services in exchange for access to the encrypted portion of the anonymous data comprises:
   circuitry for transmitting to the at least one user device associated with the user an offer to provide the one or more services using the accelerometer data in exchange for access to the encrypted portion of the anonymous data.

13. The system of claim 6, wherein circuitry for receiving personal data associated with a user from at least one user device comprises:
   circuitry for receiving personal data associated with a user from at least one user device, the personal data including at least calendar data;
   and wherein circuitry for transmitting to the at least one user device associated with the user an offer to provide the one or more services in exchange for access to the encrypted portion of the anonymous data comprises:
   circuitry for transmitting to the at least one user device associated with the user an offer to provide the one or more services using the calendar data in exchange for access to the encrypted portion of the anonymous data.

14. The system of claim 6, wherein circuitry for receiving personal data associated with a user from at least one user device comprises:
   circuitry for receiving personal data associated with a user from at least one user device, the personal data including at least social media data;
   and wherein circuitry for transmitting to the at least one user device associated with the user an offer to provide the one or more services in exchange for access to the encrypted portion of the anonymous data comprises:
   circuitry for transmitting to the at least one user device associated with the user an offer to provide the one or more services using the social media data in exchange for access to the encrypted portion of the anonymous data.

15. An apparatus comprising, comprising:
   at least one processing device; and
   one or more non-transitory media bearing one or more instructions that, when executed by the at least one processing device, configure the apparatus to perform operations including at least:
   receiving personal data associated with a user from at least one user device;
   processing the received personal data into anonymous data, the anonymous data including a non-identifying portion of the personal data and an encrypted portion that, if de-encrypted, would enable identification of the user associated with the personal data;
   receiving an indication from the at least one service provider of one or more services available to be offered to the user associated with the anonymous data if the at least one service provider were enabled to access the encrypted portion of the anonymous data;
   transmitting to the at least one user device associated with the user an offer to provide the one or more services in exchange for access to the encrypted portion of the anonymous;
   receiving an indication from the at least one user device that the user has accepted the offer to allow access to the encrypted portion of the anonymous data in exchange for the one or more services;
   transmitting the anonymous data to at least one service provider; and
   providing a key to the at least one service provider to enable de-encryption of the encrypted portion of the anonymous data in exchange for the providing of the one or more services.

16. The apparatus of claim 15, wherein receiving personal data associated with a user from at least one user device comprises:
   receiving personal data associated with a user from at least one user device, the personal data including at least positioning system data;
   and wherein transmitting to the at least one user device associated with the user an offer to provide the one or more services in exchange for access to the encrypted portion of the anonymous data comprises:
   transmitting to the at least one user device associated with the user an offer to provide the one or more services using the positioning system data in exchange for access to the encrypted portion of the anonymous data.

17. The apparatus of claim 15, wherein receiving personal data associated with a user from at least one user device comprises:
   receiving personal data associated with a user from at least one user device, the personal data including at least contact list data;
   and wherein transmitting to the at least one user device associated with the user an offer to provide the one or more services in exchange for access to the encrypted portion of the anonymous data comprises:
   transmitting to the at least one user device associated with the user an offer to provide the one or more services using the contact list data in exchange for access to the encrypted portion of the anonymous data.

18. The apparatus of claim 15, wherein receiving personal data associated with a user from at least one user device comprises:
   receiving personal data associated with a user from at least one user device, the personal data including at least accelerometer data;
   and wherein transmitting to the at least one user device associated with the user an offer to provide the one or more services in exchange for access to the encrypted portion of the anonymous data comprises:
   transmitting to the at least one user device associated with the user an offer to provide the one or more services using the accelerometer data in exchange for access to the encrypted portion of the anonymous data.

19. The apparatus of claim 15, wherein receiving personal data associated with a user from at least one user device comprises:
   receiving personal data associated with a user from at least one user device, the personal data including at least calendar data;
   and wherein transmitting to the at least one user device associated with the user an offer to provide the one or more services in exchange for access to the encrypted portion of the anonymous data comprises:
   transmitting to the at least one user device associated with the user an offer to provide the one or more services using the calendar data in exchange for access to the encrypted portion of the anonymous data.

20. The apparatus of claim 15, wherein receiving personal data associated with a user from at least one user device comprises:
  receiving personal data associated with a user from at least one user device, the personal data including at least social media data;
  and wherein transmitting to the at least one user device associated with the user an offer to provide the one or more services in exchange for access to the encrypted portion of the anonymous data comprises:
  transmitting to the at least one user device associated with the user an offer to provide the one or more services using the social media data in exchange for access to the encrypted portion of the anonymous data.

* * * * *